US011722945B2

(12) United States Patent
Gupta et al.

(10) Patent No.: US 11,722,945 B2
(45) Date of Patent: *Aug. 8, 2023

(54) MANAGING FTM FRAMES OF WLAN RTT BURSTS

(71) Applicant: Motorola Mobility LLC, Chicago, IL (US)

(72) Inventors: Ranjeet Gupta, Bengaluru (IN); Mary Khun Hor-Lao, Chicago, IL (US); Binesh Balasingh, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,826

(22) Filed: Aug. 5, 2021

(65) Prior Publication Data
US 2021/0368412 A1    Nov. 25, 2021

Related U.S. Application Data

(63) Continuation of application No. 16/540,924, filed on Aug. 14, 2019, now Pat. No. 11,115,894.

(51) Int. Cl.
| | | |
|---|---|---|
| *H04W 40/00* | (2009.01) | |
| *H04W 40/02* | (2009.01) | |
| *H04W 40/14* | (2009.01) | |
| *H04L 43/0864* | (2022.01) | |

(52) U.S. Cl.
CPC ....... *H04W 40/005* (2013.01); *H04L 43/0864* (2013.01); *H04W 40/026* (2013.01); *H04W 40/14* (2013.01)

(58) Field of Classification Search
None
See application file for complete search history.

(56) References Cited

U.S. PATENT DOCUMENTS

| | | |
|---|---|---|
| 6,215,792 B1 | 4/2001 | Abi-Nassif et al. |
| 7,177,295 B1 | 2/2007 | Sholander et al. |
| 8,560,609 B2 | 10/2013 | Nathanson |
| 8,626,912 B1 | 1/2014 | Rothstein et al. |

(Continued)

OTHER PUBLICATIONS

"Corrected Notice of Allowability", U.S. Appl. No. 16/540,924, dated Jul. 14, 2021, 11 pages.

(Continued)

*Primary Examiner* — Xavier S Wong
(74) *Attorney, Agent, or Firm* — FIG. 1 Patents

(57) ABSTRACT

In aspects of managing FTM frames of WLAN RTT bursts, a device can receive a WLAN RTT burst, such as initiated by a device application, device firmware, or received as a RTT ranging request. The device implements a status module that interposes the routing of the ranging request in the device, and determines a device state of the device with a device state monitor of the status module. The status module is implemented to drop the ranging request if the device is an idle device state such that the ranging request is extraneous. Alternatively, the status module is implemented to reduce a number of FTM frames in the ranging request based on the device state indicating that multiple FTM frames of the ranging request are extraneous, and then route to perform the ranging request of the WLAN RTT burst with the reduced number of FTM frames in the ranging request.

20 Claims, 10 Drawing Sheets

(56) References Cited

U.S. PATENT DOCUMENTS

| | | |
|---|---|---|
| 9,135,612 B1 | 9/2015 | Proctor, Jr. et al. |
| 9,414,300 B2 | 8/2016 | Wurm et al. |
| 10,959,155 B2 | 3/2021 | Poitau et al. |
| 11,115,894 B2* | 9/2021 | Gupta .................. H04W 40/14 |
| 11,432,132 B2 | 8/2022 | Gupta et al. |
| 2005/0005013 A1 | 1/2005 | Saint-Hilaire et al. |
| 2005/0044217 A1 | 2/2005 | Moreau |
| 2005/0108331 A1 | 5/2005 | Osterman |
| 2008/0279161 A1 | 11/2008 | Stirbu et al. |
| 2009/0219832 A1 | 9/2009 | Velev et al. |
| 2011/0026435 A1 | 2/2011 | Weniger et al. |
| 2011/0153818 A1 | 6/2011 | Vandwalle et al. |
| 2013/0282860 A1 | 10/2013 | Zhang et al. |
| 2013/0318570 A1 | 11/2013 | L et al. |
| 2014/0169372 A1 | 6/2014 | Kardashov et al. |
| 2014/0215580 A1 | 7/2014 | Behringer et al. |
| 2014/0309806 A1 | 10/2014 | Ricci |
| 2015/0055509 A1 | 2/2015 | De Bus et al. |
| 2015/0156630 A1 | 6/2015 | Ankaiah et al. |
| 2015/0296028 A1 | 10/2015 | Scott et al. |
| 2015/0327157 A1 | 11/2015 | Al-Shalash |
| 2016/0007289 A1 | 1/2016 | Weizman et al. |
| 2016/0072678 A1 | 3/2016 | Dong et al. |
| 2016/0127197 A1 | 5/2016 | Yethadka et al. |
| 2016/0142897 A1 | 5/2016 | Sorrentino et al. |
| 2016/0155327 A1 | 6/2016 | Schlienz et al. |
| 2016/0286471 A1 | 9/2016 | Zisimopoulos et al. |
| 2016/0309472 A1 | 10/2016 | Yong et al. |
| 2017/0006117 A1 | 1/2017 | Kafle et al. |
| 2017/0041868 A1 | 2/2017 | Palin et al. |
| 2017/0078408 A1 | 3/2017 | Lepp et al. |
| 2017/0093855 A1 | 3/2017 | Perez |
| 2017/0164264 A1 | 6/2017 | Kato et al. |
| 2017/0188330 A1 | 6/2017 | Bischinger et al. |
| 2017/0257758 A1* | 9/2017 | Aldana ................ G01S 5/0205 |
| 2018/0027398 A1 | 1/2018 | Jung et al. |
| 2018/0034923 A1 | 2/2018 | Mendonca et al. |
| 2018/0091949 A1* | 3/2018 | Steiner .................... G01S 5/14 |
| 2018/0124074 A1 | 5/2018 | Natarajan et al. |
| 2018/0139794 A1 | 5/2018 | Chae et al. |
| 2018/0234908 A1 | 8/2018 | Di Girolamo et al. |
| 2018/0255422 A1 | 9/2018 | Montemurro et al. |
| 2019/0007888 A1 | 1/2019 | Li et al. |
| 2019/0045346 A1 | 2/2019 | Macieira |
| 2019/0208270 A1 | 7/2019 | Bates et al. |
| 2019/0253869 A1 | 8/2019 | Xu et al. |
| 2019/0253955 A1 | 8/2019 | Abdini |
| 2019/0387458 A1 | 12/2019 | Li et al. |
| 2020/0029213 A1 | 1/2020 | Nolscher et al. |
| 2020/0059767 A1 | 2/2020 | Woo et al. |
| 2020/0068520 A1 | 2/2020 | Marri Sridhar et al. |
| 2020/0127751 A1 | 4/2020 | Itagaki et al. |
| 2020/0128595 A1* | 4/2020 | Dees ..................... H04W 64/00 |
| 2020/0154511 A1 | 5/2020 | Pan et al. |
| 2020/0186998 A1 | 6/2020 | Smith et al. |
| 2020/0228948 A1 | 7/2020 | Watfa et al. |
| 2020/0252857 A1 | 8/2020 | Gupta et al. |
| 2020/0267527 A1 | 8/2020 | Gupta et al. |
| 2020/0273326 A1 | 8/2020 | Shotton et al. |
| 2020/0336547 A1 | 10/2020 | Sabharwal et al. |
| 2020/0382466 A1 | 12/2020 | Ly et al. |
| 2021/0051561 A1 | 2/2021 | Gupta et al. |

OTHER PUBLICATIONS

"Final Office Action", U.S. Appl. No. 16/276,293, dated Sep. 8, 2020, 11 pages.

"Final Office Action", U.S. Appl. No. 16/276,293, dated Oct. 6, 2021, 13 pages.

"Non-Final Office Action", U.S. Appl. No. 16/540,924, dated Jan. 25, 2021, 11 pages.

"Non-Final Office Action", U.S. Appl. No. 16/276,293, dated Mar. 31, 2021, 11 pages.

"Non-Final Office Action", U.S. Appl. No. 16/276,293, dated Mar. 19, 2020, 9 pages.

"Notice of Allowance", U.S. Appl. No. 16/540,924, dated Jun. 25, 2021, 14 pages.

"Shapeheart Armband | Heart rate tracking & easy phone access", Retrieved at: https://www.kickstarter.com/projects/2052448589/shapeheart-armband-heart-rate-tracking-and-easy-ph—on Oct. 24, 2018, 22 pages.

"Notice of Allowance", U.S. Appl. No. 16/276,293, dated Apr. 28, 2022, 8 pages.

* cited by examiner

US 11,722,945 B2

MANAGING FTM FRAMES OF WLAN RTT BURSTS

RELATED APPLICATION

This application is a continuation of and claims priority to U.S. patent application Ser. No. 16/540,924 filed Aug. 14, 2019 entitled "Managing FTM Frames of WLAN RTT Bursts," the disclosure of which is incorporated by reference herein in its entirety.

BACKGROUND

Devices such as smart devices, Internet of Things (IoT) devices, wireless access points, mobile devices (e.g., cellular phones, tablet devices), consumer electronics, and the like can be implemented for use in a wide range of industries and may use various networking technologies and protocols to communicate with other devices, servers, and/or cloud-based systems. For example, many people have computing devices such as smartphones or smartwatches that they carry with them or wear throughout the day, and may have applications that provide location-based services, such as direction or navigation services.

In order for applications to provide location-based services, such as for a user of a mobile device, the location of the mobile device needs to be determined. One technique for determining the location of a mobile device is wireless round trip time (RTT) ranging. The mobile device communicates with one or more wireless access points using wireless RTT ranging to determine the distance to the wireless access points. Given the amount of time it takes for data frames to be communicated from a wireless access point to the mobile device, the distance between the wireless access point and the mobile device can be determined. The mobile device can determine its relative or absolute location, particularly in an indoor environment, within close accuracy based on the distance measurements to three or more wireless access points using wireless RTT ranging and trilateration, or multilateration. This is also commonly referred to as the fine timing measurement (FTM) protocol, which is a geometrical approach to estimate the location of a mobile device using the distances from the wireless access points operating as FTM responders.

A mobile device, or other network computing device, can initiate a wireless local area network (WLAN) RTT request as a RTT burst that includes an initial FTM request and acknowledgement, as well as multiple FTM data frames. Generally, each WLAN RTT burst will include eight FTM data frames after the initial FTM request and acknowledgement. Based on the IEEE 802.11mc protocol, a WLAN RTT burst is based on $2^n$, where n=0 to 31, and a higher "n" value will provide a higher degree of accuracy for each of the eight FTM data frames. This FTM response processing for RTT ranging can consume a high percentage of device CPU resources, as well as consumes device battery power. Notably, the power drain on a mobile device battery increases exponentially as the value of "n" is increased for the WLAN RTT bursts and processing the eight FTM responses for each WLAN RTT burst.

Typically, the various mobile devices and network computing devices can communicate and/or receive WLAN RTT bursts for FTM as network data messages. When a device application and/or device firmware initiates or responds to a WLAN RTT burst for FTM, this wakes the device CPU in order to facilitate processing the FTM frames and perform the RTT ranging, and typically for battery-powered mobile devices, consumes device battery power. For example, if a receiving device is in a low-power, idle, or sleep state and receives a FTM request as a WLAN RTT burst that requires a response, the receiving device may then need to transition from the low-power, idle, or sleep state to an active state in order to respond to the received request. However, frequent WLAN RTT bursts may be unneeded or are not required, which results in unnecessary network communications causing network bandwidth congestion, as well as draining the battery power of the device.

BRIEF DESCRIPTION OF THE DRAWINGS

Implementations of managing FTM frames of WLAN RTT bursts are described with reference to the following Figures. The same numbers may be used throughout to reference like features and components shown in the Figures.

DETAILED DESCRIPTION

Figure 1:
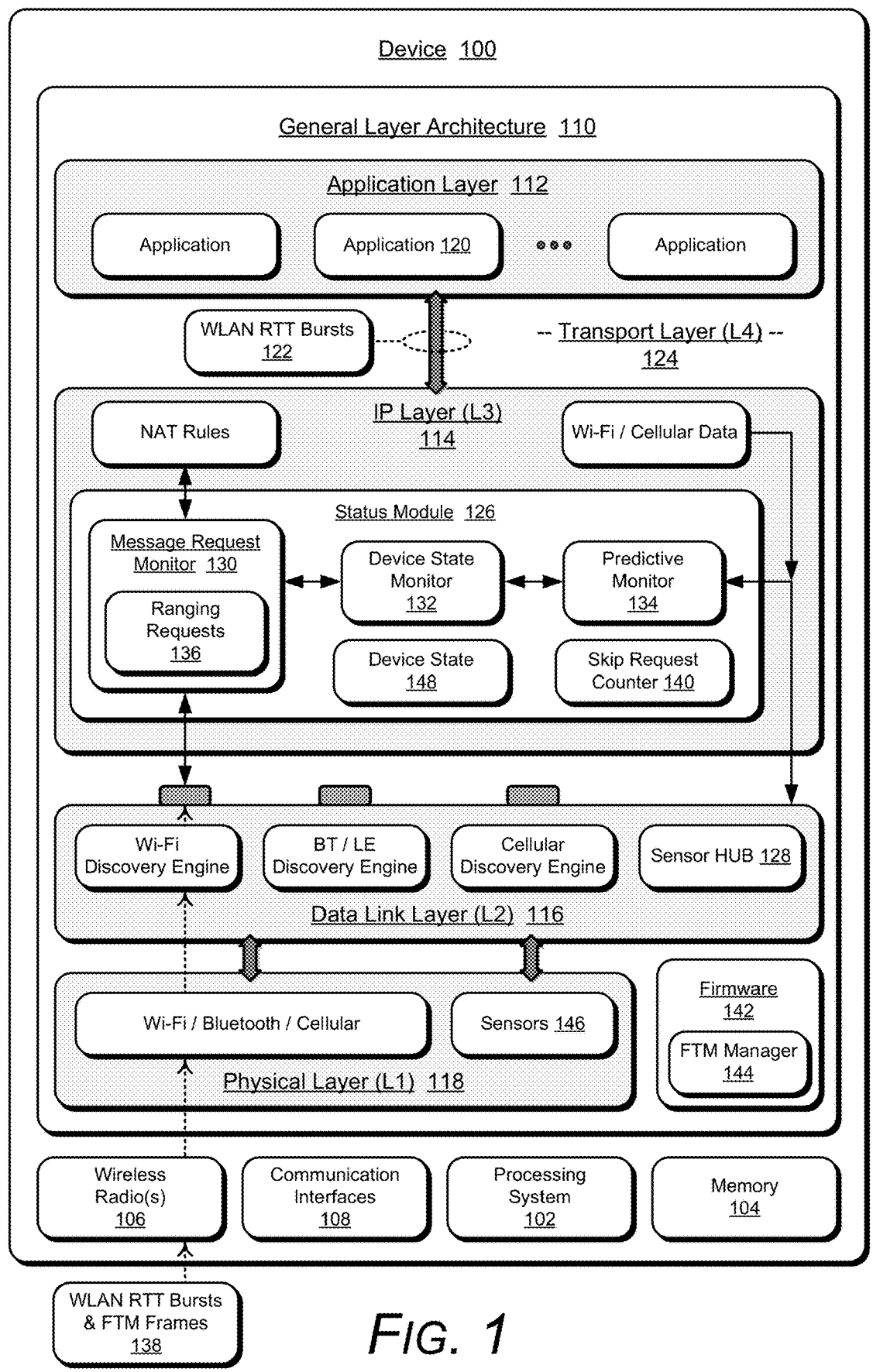
FIG. 1 illustrates an example device that can be used to implement techniques of managing FTM frames of WLAN RTT bursts as described herein.

Implementations of managing FTM frames of WLAN RTT bursts are described, and provide techniques to determine whether ranging requests received as wireless local area network (WLAN) round trip time (RTT) bursts for fine timing measurement (FTM) can be dropped or adjusted before being processed in a device or transmitted from the device. Notably, the described techniques can maintain a device operating in a low-power state (to include any low-power, idle, or sleep mode of the device) and conserves battery power, as well as avoids contributing to communication bandwidth congestion. The features and aspects of managing FTM frames of WLAN RTT bursts can be implemented by any device, mobile phone, access point, node device, or other computing device that is implemented for wired and/or wireless network communication or service.

Generally, a network of devices can include multiple devices or systems, such as Internet of Things (IoT) devices, smart devices, access points, node devices, consumer electronics, and any other type of devices that generate and/or communicate or otherwise transmit or receive WLAN RTT bursts for FTM. A mobile device, or other network computing device, can initiate a WLAN RTT ranging request as a RTT burst that includes an initial FTM request and acknowledgement, as well as multiple FTM data frames. For example, a mobile device can communicate with other network devices, such as one or more wireless access points, using wireless RTT ranging to determine the distance to the wireless access points. The mobile device and the wireless access points can each send and receive various data frames, notably without the mobile device needing to connect to the wireless access points. The various data frames (e.g., multiple FTM data frames), along with an initial FTM request and acknowledgement, are collectively referred to as a WLAN RTT burst.

Given the amount of time it takes for the FTM data frames to be communicated from a wireless access point to the mobile device, and the propagation speed of signals over the wireless network, the distance between the wireless access point and the mobile device can be determined. The mobile device can then determine its relative or absolute location, particularly in an indoor environment, within close accuracy based on the distance measurements to three or more wireless access points using wireless RTT ranging and trilateration, or multilateration. This is also commonly referred to as the fine timing measurement (FTM) protocol, which is a geometrical approach to estimate the location of a mobile device using the distances from the wireless access points operating as FTM responders.

Frequent WLAN RTT bursts for FTM may be unneeded or are not required, particularly for devices that are stationary or for devices that are traveling and changing locations quickly. These frequent and unnecessary WLAN RTT bursts can result in network bandwidth congestion, as well as draining the battery power of the devices. For example, a receiving device in a low-power state (to include any low-power, idle, or sleep mode of the device) may receive a FTM request as a WLAN RTT burst that requires a response, and the receiving device may then need to transition from the low-power, idle, or sleep state to an active state in order to respond to the received request. Additionally, a device communicating and/or responding to all of the FTM data frames congests network bandwidth and adds unnecessary noise on the communication medium.

In aspects of managing FTM frames of WLAN RTT bursts, a device can be implemented to determine whether ranging requests received as WLAN RTT bursts for FTM can be dropped or adjusted before being processed in a device or transmitted from the device. Generally, as a type of computing device, the device implements a status module that can interpose a routing of a ranging request received as a WLAN RTT burst, which generally refers to the functions or operations performed to detect and identify the ranging request, and subsequently determine whether the ranging request can be dropped prior to being processed and/or communicated. Alternatively, the status module is implemented to reduce a number of FTM frames in the ranging request based on a device state indicating that multiple FTM frames of the ranging request are extraneous, and then route the ranging request of the WLAN RTT burst with the reduced number of FTM frames in the ranging request.

In implementations, the status module can receive sensor data from device sensors to determine a device state of the device, which may indicate that the device is in a stationary mode or in a vehicle mode. Notably, a response to a ranging request may be extraneous (e.g., unneeded, irrelevant) if the device state of the device is in either the stationary mode or in the vehicle mode, due to the device generally not moving, or moving too fast to meaningfully determine the current location of the device. Additionally, a determination of the device state may also include a check of whether the device is operating in a lower-power or idle state.

Alternatively or in addition to a determination of the device state of a device based on sensor data, the status module can determine the device state based on cellular data and/or Wi-Fi data. The status module can determine the device state based on a cellular data threshold change and/or based on a Wi-Fi data threshold change that indicates the device is stationary or rapidly moving, such as in a vehicle. Notably, a determination of the device state based on cellular data and/or Wi-Fi data can still be performed if a device does not include device sensors. Any one or combination of data obtained from device sensors, cellular data, PCI/CellId (LTE physical cell identity), Wi-Fi data, a delta of a received signal strength indicator (RSSI), the cellular network type, device registration data, a mobile country code (MCC), a mobile network code (MNC), or other types of device data can be used to implement the periodicity of RTT ranging requests being processed in a device or communicated from the device. The data obtained from device sensors, from cellular data, from Wi-Fi data, and/or from the other types of data can be used by the status module to intelligently identify when to communicate or transmit WLAN RTT bursts for FTM in compliance with current protocols, while maintaining a lower-power profile, and avoiding adding to network bandwidth congestion.

While features and concepts of managing FTM frames of WLAN RTT bursts can be implemented in any number of different devices, systems, networks, environments, and/or configurations, implementations of managing FTM frames of WLAN RTT bursts are described in the context of the following example devices, systems, and methods.

FIG. 1 illustrates an example of a device 100 in which techniques of managing FTM frames of WLAN RTT bursts can be implemented, as described herein. In this example, the device 100 is representative of any type of a computing device, mobile device (e.g., mobile phone or tablet), Internet of Things (IoT) device, wireless device, access point, node device, and/or electronic device implemented for network and/or wireless communication. The device 100 may also be configured as a wearable device that is designed to be worn by, attached to, carried by, or otherwise transported by a user, such as any type of glasses, a smart band or watch, media playback device, and fitness device. Generally, the device 100 can be implemented with various components, such as a processing system 102 and memory 104, as well as any number and combination of different components as further described with reference to the example device shown in FIG. 10.

Various devices can communicate with each other via a network (e.g., WLAN) or via a direct peer-to-peer connection (e.g., Wi-Fi Direct, Bluetooth™, Bluetooth LE (BLE), RFID, etc.). The device 100 can include wireless radios 106 that facilitate wireless communications, as well as communication interfaces 108 that facilitate network communications. The device 100 can be implemented for data communication between devices and network systems, which may include wired and/or wireless networks implemented using any type of network topology and/or communication protocol, to include IP based networks, and/or the Internet, as well as networks that are managed by mobile network operators, such as a communication service providers, mobile phone providers, and/or Internet service providers.

In this example, operational aspects of the device 100 are represented with a general layer architecture 110, which is generally representative of an Internet Protocol Suite (TCP/IP four-layer model), or an Open System Interconnection Model (OSI seven-layer model), that characterizes the communication and networking functions in the device. This general layer architecture 110 is shown to have an application layer 112, an Internet protocol (IP) layer 114, a data link layer 116, and a physical layer 118. The application layer 112 includes device applications 120 that generate and initiate to communicate data messages, and the application layer 112 includes the protocols used by the device applications 120 to provide user services and exchange of application data over the network connections established by the lower level protocols.

A device application 120 can initiate ranging requests as WLAN RTT bursts 122 for FTM, generally as a unicast, multicast, or broadcast messages initiated for network discovery or discovery of network services. In implementations, a WLAN RTT burst 122 for FTM may be initiated by a device application 120 that provides location-based services, such as for a user of the device, and the location of the device needs to be determined. As discussed below, the device 100 may include firmware which can be implemented to offload and manage the WLAN RTT bursts 122 and FTM frames. The device application 120 can determine the relative or absolute location of the device, particularly in an indoor environment, within close accuracy (e.g., within one to two meters) based on distance measurements to three or more wireless access points using wireless RTT ranging requests fine timing measurements (FTM). Generally, the WLAN RTT bursts 122 may be processed by RTT ranging request APIs in a transport layer 124 (also commonly referred to as "L4") of the general layer architecture 110. In implementations, a ranging request initiated by a device application 120 or device firmware as a WLAN RTT burst 122 can be accompanied by a source address list identifying source addresses of wireless devices with which RTT ranging is desired by the application.

Generally, a device application 120 can determine other wireless devices within wireless communication range of the device 100, and identify these wireless devices, or another application or program (e.g. an operating system program) can identify these other wireless devices. The device application 120 generates a source address list, which refers to a list of source addresses that are to be RTT ranged with. In one or more implementations, these source addresses are specified by the corresponding BSSIDs of the wireless devices, in which case the source address list can be referred to as a BSSID list. Notably, the device 100 need not connect to the other wireless devices when performing wireless RTT ranging. Rather, the other wireless devices support responding to wireless RTT ranging requests without requiring the device sending the wireless RTT ranging request to connect to the wireless devices. The device 100 need not perform the steps traditionally associated with being connected to another wireless device (e.g., in accordance with the IEEE 802.11 standard), such as providing a password or security key to the wireless device, establishing security settings, establishing bit rates, and so forth.

The IP layer 114 (also commonly referred to as "L3") of the general layer architecture 110 is representative of the data communication channels for the data messages to and from the device applications 120 in the application layer 112, and generally provides for address and routing of network connections, host addressing and identification, and packet routing. Generally, aspects of the IP layer 114 implement message transfer services, and protocols in this layer provide error control, segmentation, flow control, and bandwidth congestion control. In this example, the IP layer 114 includes a status module 126 that implements aspects of managing FTM frames of WLAN RTT bursts, as described herein and in more detail below.

The data link layer 116 (also commonly referred to as "L2") of the general layer architecture 110 generally provides for data transfer between network entity components, the transmission of internet layer data, protocols used to describe the local network topology, and the interfaces needed to effect transmission of Internet layer datagrams. In this example, the data link layer 116 includes various discovery engines, such as for Wi-Fi, Bluetooth™ and LE, cellular (wireless), as well as a sensor HUB 128. The physical layer 118 (also commonly referred to as "L1") of the general layer architecture 110 includes the wireless radios 106 and the communication interfaces 108, as well as any other hardware electronic circuits of network communication technologies.

In aspects of managing FTM frames of WLAN RTT bursts, the status module 126 includes monitor components, such as a message request monitor 130, a device state monitor 132, and a predictive monitor 134. The status module 126 may be implemented to include independent processing, memory, and logic components as a computing and/or electronic device integrated with the device 100. Alternatively or in addition, the status module 126 can be implemented as a software application or software module, such as computer-executable software instructions that are executable with a processor (e.g., with the processing system 102) of the device 100. As a software application, the status module 126 can be stored on computer-readable storage memory (e.g., the device memory 104), such as any suitable memory device or electronic data storage implemented with the device.

The message request monitor 130 of the status module 126 is implemented to interpose a routing of a ranging request 136 that is received as a WLAN RTT burst 122 for FTM, such as initiated by a device application 120 or device firmware. The message request monitor 130 is also implemented to interpose the routing of ranging requests 136 that may be received by the wireless radios 106 as WLAN RTT bursts and FTM frames 138. As noted above, the ranging requests 136 may be any type of unicast, multicast, or broadcast messages intended for communication and/or transmission from the respective wireless radios 106 and communication interfaces 108 of the device 100.

The message request monitor 130 interposes the ranging request 136, which generally refers to the functions or operations performed to detect and identify the ranging request 136, and subsequently determine whether the ranging request can be dropped or adjusted prior to being processed in the device 100 or transmitted from the device. Notably, dropping or adjusting the ranging request 136 can maintain the device 100 operating in a low-power or idle state and conserves battery power, as well as avoids contributing to communication bandwidth congestion. Various implementations of determining whether the ranging request 136 can be dropped or adjusted by the message request monitor 130 in the device 100 are further described with reference to the features shown in FIGS. 3-9.

The status module 126 includes a skip request counter 140 that can be incremented each time a ranging request 136 is dropped, rather than the ranging request being processed in the device 100 or communicated from the device. In implementations, the status module 126 is implemented to drop a ranging request 136 if the device state is an idle device state, and increment the skip request counter 140 for each dropped ranging request. When a threshold x-number of ranging requests 136 have previously been dropped, the status module 126 can override the current ranging request from being dropped, and continue the routing of the ranging request 136 in the device.

In implementations, the status module 126 can route a ranging request 136 in the device 100 to perform the ranging request of a WLAN RTT burst 122 with the multiple FTM frames in the ranging request. Alternatively, the status module 126 can reduce a number of FTM frames in a ranging request 136 based on a device state indicating that multiple FTM frames of the ranging request are extraneous. The status module 126 can then route the ranging request 136 of the WLAN RTT burst in the device 100 to perform the ranging request with the reduced number of FTM frames in the ranging request. In implementations, the device 100 has firmware 142 that includes a firmware manager 144, which can be implemented to offload and manage the WLAN RTT bursts 122 and FTM frames. Rather than being triggered by the application layer 112, the FTM manager 144 can initiate ranging requests as the WLAN RTT bursts 122 for FTM. The FTM manager 144 in the firmware 142 can decide when to issue FTM, and this can be done when the device is in a low-power state, to include any low-power, idle, or sleep mode of the device. In alternative implementations, the firmware 142 may also implement the status module 126 in aspects of managing FTM frames of WLAN RTT bursts, as described herein.

Figure 2:
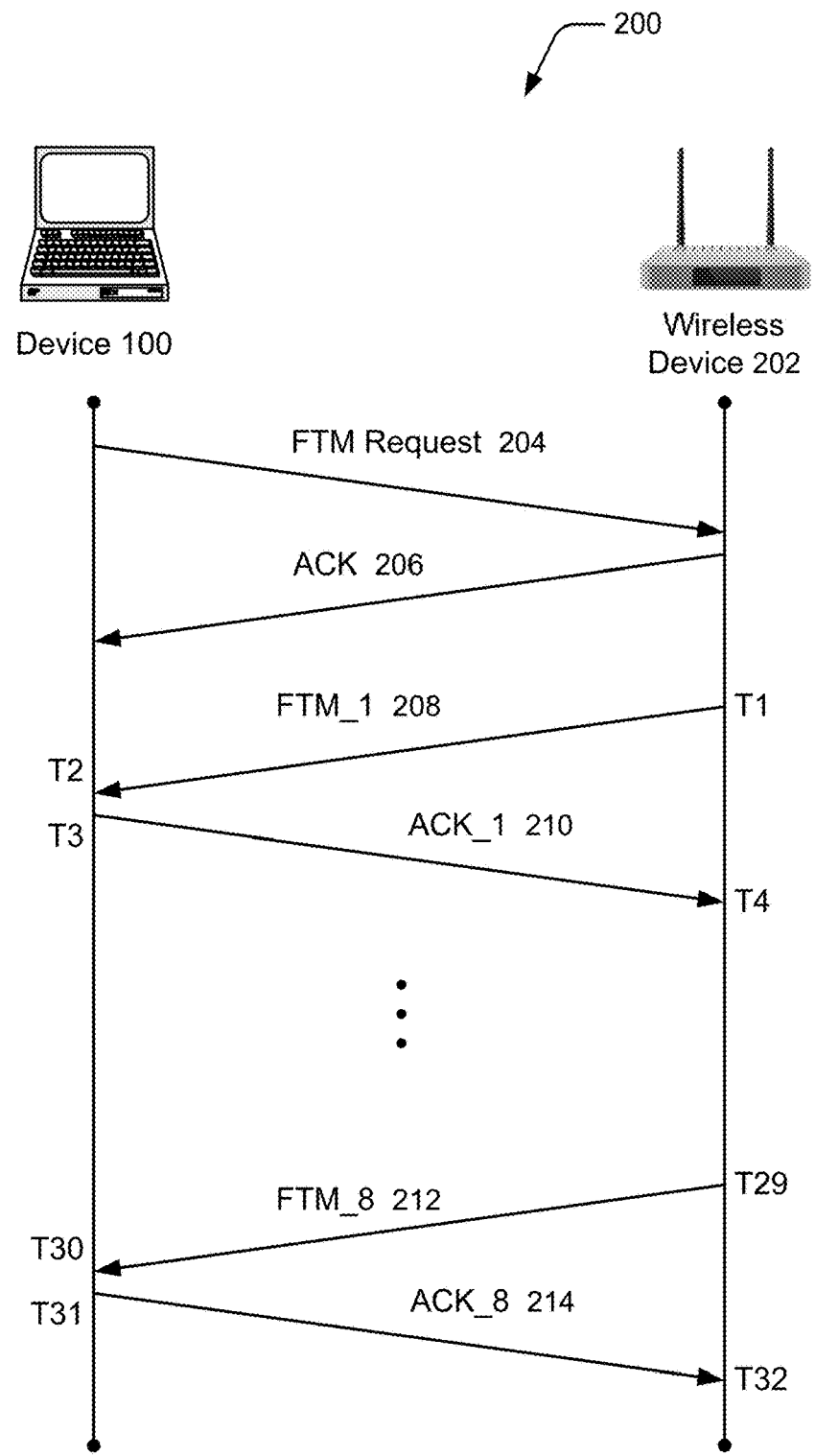
FIG. 2 illustrates an example of two-sided RTT ranging used in accordance with the techniques described herein for managing FTM frames of WLAN RTT bursts.

FIG. 2 illustrates an example 200 of RTT ranging, such as may be implemented in accordance with the techniques described herein for managing FTM frames of WLAN RTT bursts. In the example 200, the device 100 (e.g., a mobile device or computing device) initiates a WLAN RTT burst by communicating a wireless RTT ranging request 136 to a wireless device 202 (e.g., a wireless access point), illustrated as FTM request 204. In implementations, the FTM request 204 is a request for the wireless device 202 to send a set of one or more FTM frames. The frames communicated between the device 100 and the wireless device 202 are collectively referred to as a WLAN RTT burst 122, where each WLAN RTT burst includes eight FTM data frames after the initial FTM request and acknowledgement. Although the example 200 is shown and described as including one WLAN RTT burst with FTM frames, multiple WLAN RTT bursts for FTM can be requested (e.g., ranging from 1 to $2^{31}$) and each WLAN RTT burst can include various numbers of FTM frames (e.g., ranging from 1 to 31).

The wireless device 202 receives the FTM request 204 and returns an acknowledgment (ACK) 206 indicating that the FTM request 204 has been received. The wireless device 202 then sends a first FTM frame, illustrated as FTM_1 208. Each FTM frame includes a timestamp indicating the time that the FTM frame was sent (or created), illustrated as T1 for the frame FTM_1 208. The device 100 receives the frame FTM_1 208 at time T2, and at time T3, sends an acknowledgement illustrated as ACK_1 210 back to the wireless device 202. The wireless device 202 receives the acknowledgement ACK_1 210 at time T4. This process continues for eight FTM frames. The eighth FTM frame is illustrated as frame FTM_8 212, sent by the wireless device 202 at time T29 and received by the device 100 at time T30. The device 100 responds to the frame FTM_8 212 with an acknowledgement ACK_8 214, which serves as the end of the wireless RTT ranging communication between the device 100 and the wireless device 202.

The device 100 collects RTT measurements, which are the time differences between the time that each FTM frame was sent by the wireless device 202 (as indicated in the timestamp in the FTM frame) and the time the FTM frame is received by the device 100. For example, the time difference to communicate frame FTM_1 208 is T2−T1. The time differences for the multiple FTM frames can be combined in various manners, such as averaged. These RTT measurements can be used by the status module 126 to determine the distance between the device 100 and the wireless device 202.

Referring again to FIG. 1, the device state monitor 132 of the status module 126 can be registered with the sensor HUB 128 in the data link layer 116, from which the device state monitor 132 can receive sensor data from device sensors 146 and determine a device state 148 of the device 100. The device sensors 146 can include a camera, RF-based sensors, and/or motion sensors, such as may be implemented as components of an inertial measurement unit (IMU). The motion sensors can be implemented with various sensors, such as a gyroscope, an accelerometer, and/or other types of motion sensors to sense motion of the device. The device state monitor 132 can determine the device state 148 of the device 100 based on input from one or more of the device sensors 146, which indicate that the device is in a stationary mode or in a vehicle mode. Additionally, a determination of the device state 148 by the device state monitor 132 may also include checking whether the device 100 is operating in a lower-power or idle state, such as operating on the low-power IC.

Notably, wireless RTT ranging may be extraneous (e.g., unneeded, irrelevant) if the device state 148 of the device 100 is in either the stationary mode or in the vehicle mode, due to the device generally not moving, or moving too fast to meaningfully perform RTT ranging and determine the current location of the device. The device state monitor 132 of the status module 126 is implemented to determine the device state 148 based on input from one or more of the device sensors 146 that indicate the device 100 is in a stationary mode or in a vehicle mode. The multiple FTM frames in a ranging request 136 are extraneous in either of the stationary mode or the vehicle mode of the device, and the status module 126 is implemented to reduce the number of FTM frames in the ranging request effective to conserve battery power of the device and avoid contributing to communication bandwidth congestion.

Alternatively or in addition to a determination of the device state 148 of the device 100 based on sensor data, the device state monitor 132 can determine the device state 148 based on cellular data and/or Wi-Fi data, which is generally available at the lower layer from any one of the connectivity transport modules, such as from a Bluetooth™ driver and/or firmware, from a WLAN driver and/or firmware, from a WAN driver and/or firmware, and the like. The device state monitor 132 of the status module 126 can be implemented to access the cellular and/or Wi-Fi data via these various transport modules through the sensor HUB 128, or by a direct data call to the various transport modules. In implementations, the a device state monitor 132 of the status module 126 can determine the device state 148 based on a cellular data threshold change that indicates the device is stationary or rapidly moving, and/or based on a Wi-Fi data threshold change that indicates the device is stationary or rapidly moving, such as in a vehicle.

The device state monitor 132 of the status module 126 is implemented to determine the device state 148 based on a cellular data threshold change that indicates the device is stationary or rapidly moving, or based on a Wi-Fi data threshold change that indicates the device is stationary or rapidly moving. The multiple FTM frames in a ranging request 136 are extraneous in either of the stationary mode or the vehicle mode of the device, and the status module 126 is implemented to reduce the number of FTM frames in the ranging request effective to conserve battery power of the device and avoid contributing to communication bandwidth congestion.

Notably, a determination of the device state 148 based on cellular data and/or Wi-Fi data can still be performed if an implementation version of the device 100 does not include the device sensors 146. Any one or combination of data obtained from the device sensors 146, from cellular data, or from Wi-Fi data can be used by the device state monitor 132 as a basis to reduce wireless RTT ranging in the device 100. As an extension of the aspects of managing FTM frames of WLAN RTT bursts, if the device state monitor 132 determines the device state 148 as the device 100 being in a vehicle mode (e.g., in a train, in a car, or on an airplane), then subsequent wireless RTT ranging may not need to be performed. As trains are detected to be often halting and then resuming, the wireless RTT ranging can be restarted to determine new devices and/or services that are available at a current location of the device 100.

Similarly, the predictive monitor 134 of the status module 126 can be implemented to determine and track device locations and history, from which a determination to drop or adjust a ranging request 136 can be based on the device 100 being in a predictive location where RTT ranging would be extraneous or unnecessary. For example, a particular route of travel or travel in a new area may lead to an increase in RTT ranging requests being initiated by the device applications 120 and/or the FTM manager 144 in the device firmware 142 of the device 100, causing battery power to be consumed more quickly than usual and adding congestion to network bandwidth. In any of the described scenarios, the device state monitor 132 can perform the monitoring operations in the low-power or idle state of the device 100, so as not to impact the output profile of the device operating at the lower-power rate.

The periodic RTT ranging requests and communication of the ranging requests as WLAN RTT bursts for FTM can cause the device 100 to unnecessarily transition to a higher-power rate, determine that a received data packet is not needed, and then drop the data packet. This periodic transition of waking the core processor to process data packets that are determined not to be needed can cause battery power in the device to be consumed more quickly and adds congestion to network bandwidth. The data obtained from the device sensors 146, from the cellular data, and/or from the Wi-Fi data can be used by the device state monitor 132 to intelligently identify when to process, adjust, and/or communicate RTT ranging requests, while maintaining a lower-power profile, and avoiding adding to network bandwidth congestion.

Example methods 300 through 900 are described with reference to respective FIGS. 3-9 in accordance with implementations of managing FTM frames of WLAN RTT bursts. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
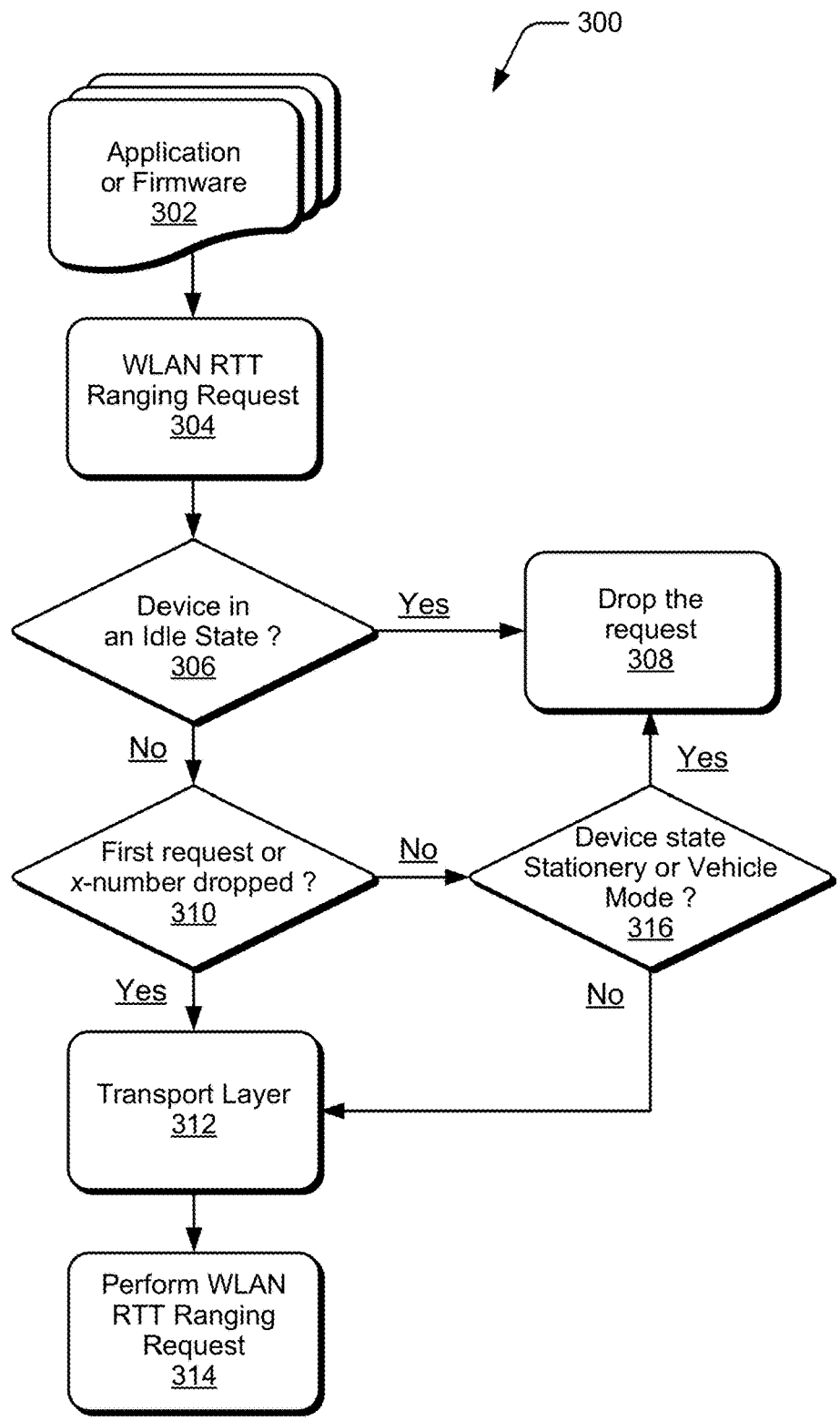
FIG. 3 illustrates an example method of managing FTM frames of WLAN RTT bursts in a device, such as by dropping ranging requests in accordance with one or more implementations of the techniques described herein.

FIG. 3 illustrates example method(s) 300 of managing FTM frames of WLAN RTT bursts, and is generally described with reference to the status module implemented in a device and based on device sensors. The order in which the method is described is not intended to be construed as a limitation, and any number or combination of the described method operations can be performed in any order to perform a method, or an alternate method.

At 302, a device initiates a WLAN RTT burst for FTM. For example, a device application 120 in the device 100 initiates a WLAN RTT burst 122 for FTM, such as to provide a location-based service for a user of the device, and the location of the device needs to be determined. Alternatively, the FTM manager 144 in the device firmware 142 offloads and manages ranging requests as the WLAN RTT bursts 122 for FTM in the device 100, and the FTM manager 144 initiates a WLAN RTT burst 122 for FTM. The device application 120 determines the relative or absolute location of the device, particularly in an indoor environment, within close accuracy based on distance measurements to three or more wireless access points using wireless RTT ranging requests fine timing measurements (FTM).

At 304, the WLAN RTT ranging request is received. For example, the message request monitor 130 of the status module 126 in the device 100 receives a ranging request 136 that is received as a WLAN RTT burst 122 for FTM, such as initiated by the device application 120 and/or the FTM manager 144 in the device firmware 142. The message request monitor 130 may also receive ranging requests 136 via the wireless radios 106 as WLAN RTT bursts and FTM frames 138 that are received by the device 100.

At 306, a determination is made as to whether the device is in an idle state. For example, the device state monitor 132 of the status module 126 is registered with the sensor HUB 128 in the data link layer 116, from which the device state monitor 132 receives sensor data from device sensors 146 and determines a device state 148. The device state monitor 132 can also determine an idle state of the CPU in the device 100. If the device is determined to be in an idle state (i.e., "Yes" from 306), then at 308, the ranging request is dropped. For example, the status module 126 drops the ranging request 136, rather than the ranging request being processed in the device 100 or communicated from the device, which maintains the device 100 operating in a low-power or idle state and conserves battery power, as well as avoids contributing to communication bandwidth congestion.

If the device is not in an idle state (i.e., "No" from 306), then at 310 a determination is made as to whether the WLAN RTT ranging request is the first initiated request, or whether a threshold x-number of ranging requests have already been dropped. For example, the status module 126 in the device 100 includes the skip request counter 140 that is incremented each time a ranging request is dropped, rather than being processed in the device and/or communicated from the device. Notably, if the ranging request 136 is not the first attempt at the particular message type, and the skip request counter 140 has not yet incremented to the threshold x-number of ranging requests that have already been dropped in the device, then a determination can be made as to whether the current ranging request 136 is extraneous and can be adjusted or dropped in the device.

If the WLAN RTT ranging request is determined to be the first initiated request, or the skip request counter has reached the threshold x-number of dropped ranging requests, then at 312, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 314, the WLAN RTT ranging request is performed by the device 100.

If the WLAN RTT ranging request is not the first initiated request, or the skip request counter has not yet incremented to the threshold x-number of dropped ranging requests (i.e., "No" from 310), then at 316, a determination is made as to whether the device state indicates that the device is in either a stationary mode or in a vehicle mode. For example, the device state monitor 132 of the status module 126 determines the device state 148 of the device 100, and in implementations, the device state can be determined from the device sensors 146 that indicate the device is in a stationary mode or in a vehicle mode. Notably, the ranging request 136 may be extraneous if the device state 148 of the device 100 is in either the stationary mode or in the vehicle mode, due to the device generally not moving, or moving too fast to meaningfully perform RTT ranging and determine the current location of the device. Additionally, a determination of the device state 148 by the device state monitor 132 may also include checking whether the device 100 is operating in a lower-power or idle state, such as operating on the low-power IC.

If the device state indicates that the device is either in a stationary mode or in a vehicle mode (i.e., "Yes" from 316), then at 308, the ranging request that was initiated by the device application or received via the wireless radios 106 as a WLAN RTT burst and FTM frames 138 is dropped. For example, the status module 126 in the device 100 drops the ranging request 136 if the device state 148 indicates that the device is either in a stationary mode or in a vehicle mode. Notably, dropping the ranging request 136 can maintain the device operating in a low-power or idle state and conserves battery power, as well as avoids contributing to communication bandwidth congestion by processing or transmitting out the ranging request.

If the device state indicates that the device is not in either a stationary mode or a vehicle mode (i.e., "No" from 316), then at 312, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 314, the WLAN RTT ranging request is performed by the device 100.

Figure 4:
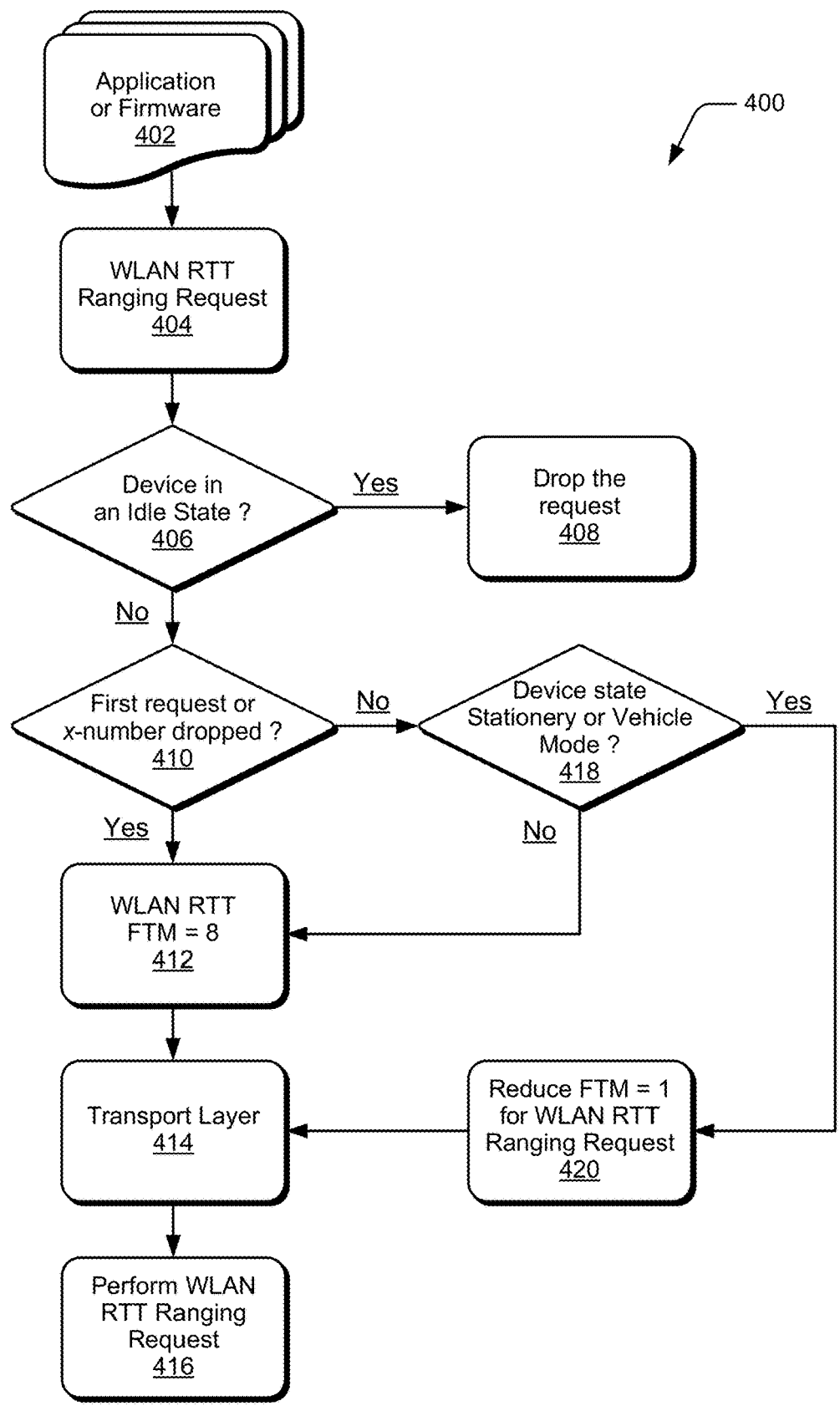
FIG. 4 illustrates an example method of managing FTM frames of WLAN RTT bursts in a device, such as by reducing the number of FTM frames in accordance with one or more implementations of the techniques described herein.

FIG. 4 illustrates example method(s) 400 of managing FTM frames of WLAN RTT bursts and is generally described with reference to the status module implemented in a device and based on device sensors. The order in which the method is described is not intended to be construed as a limitation, and any number or combination of the described method operations can be performed in any order to perform a method, or an alternate method.

At 402, a device initiates a WLAN RTT burst for FTM. For example, a device application 120 in the device 100 initiates a WLAN RTT burst 122 for FTM, such as to provide a location-based service for a user of the device, and the location of the device needs to be determined. Alternatively, the FTM manager 144 in the device firmware 142 offloads and manages ranging requests as the WLAN RTT bursts 122 for FTM in the device 100, and the FTM manager 144 initiates a WLAN RTT burst 122 for FTM. The device application 120 determines the relative or absolute location of the device, particularly in an indoor environment, within close accuracy based on distance measurements to three or more wireless access points using wireless RTT ranging requests fine timing measurements (FTM).

At 404, the WLAN RTT ranging request is received. For example, the message request monitor 130 of the status module 126 in the device 100 receives a ranging request 136 that is received as a WLAN RTT burst 122 for FTM, such as initiated by the device application 120 and/or the FTM manager 144 in the device firmware 142. The message request monitor 130 may also receive ranging requests 136 via the wireless radios 106 as WLAN RTT bursts and FTM frames 138 that are received by the device 100.

At 406, a determination is made as to whether the device is in an idle state. For example, the device state monitor 132 of the status module 126 is registered with the sensor HUB 128 in the data link layer 116, from which the device state monitor 132 receives sensor data from device sensors 146 and determines a device state 148. The device state monitor 132 can also determine an idle state of the CPU in the device 100. If the device is determined to be in an idle state (i.e., "Yes" from 406), then at 408, the ranging request is dropped. For example, the status module 126 drops the ranging request 136, rather than the ranging request being processed in the device 100 or communicated from the device, which maintains the device 100 operating in a low-power or idle state and conserves battery power, as well as avoids contributing to communication bandwidth congestion.

If the device is not in an idle state (i.e., "No" from 406), then at 410 a determination is made as to whether the WLAN RTT ranging request is the first initiated request, or whether a threshold x-number of ranging requests have already been dropped. For example, the status module 126 in the device 100 includes the skip request counter 140 that is incremented each time a ranging request is dropped, rather than being processed in the device and/or communicated from the device. Notably, if the ranging request 136 is not the first attempt at the particular message type, and the skip request counter 140 has not yet incremented to the threshold x-number of ranging requests that have already been dropped in the device, then a determination can be made as to whether the current ranging request 136 is extraneous and can be adjusted or dropped in the device.

If the WLAN RTT ranging request is determined to be the first initiated request, or the skip request counter has reached the threshold x-number of dropped ranging requests, then at 412, the number of FTM data frames in the WLAN RTT burst for FTM is maintained as eight data frames for the ranging request. At 414, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 416, the WLAN RTT ranging request is performed by the device 100.

If the WLAN RTT ranging request is not the first initiated request, or the skip request counter has not yet incremented to the threshold x-number of dropped ranging requests (i.e., "No" from 410), then at 418, a determination is made as to whether the device state indicates that the device is in either a stationary mode or in a vehicle mode. For example, the device state monitor 132 of the status module 126 determines the device state 148 of the device 100, and in implementations, the device state can be determined from the device sensors 146 that indicate the device is in a stationary mode or in a vehicle mode. Notably, the ranging request 136 may be extraneous if the device state 148 of the device 100 is in either the stationary mode or in the vehicle mode, due to the device generally not moving, or moving too fast to meaningfully perform RTT ranging and determine the current location of the device.

If the device state indicates that the device is not in either a stationary mode or a vehicle mode (i.e., "No" from 428), then at 412, the number of FTM data frames in the WLAN RTT burst for FTM is maintained as eight data frames for the ranging request. At 414, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 416, the WLAN RTT ranging request is performed by the device 100.

If the device state indicates that the device is in either a stationary mode or in a vehicle mode (i.e., "Yes" from 418), then at 420, the number of FTM data frames in the WLAN RTT burst for FTM is reduced to one data frame for the ranging request. For example, the status module 126 reduces the number of FTM frames in the ranging request 136 based on a device state indicating that multiple FTM frames of the ranging request are extraneous. The status module 126 can then route the ranging request 136 of the WLAN RTT burst in the device 100 to perform the ranging request with the reduced number of FTM frames in the ranging request. For example, at 414, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 416, the WLAN RTT ranging request is performed by the device 100 with the reduced number of FTM frames in the ranging request.

Figure 5:
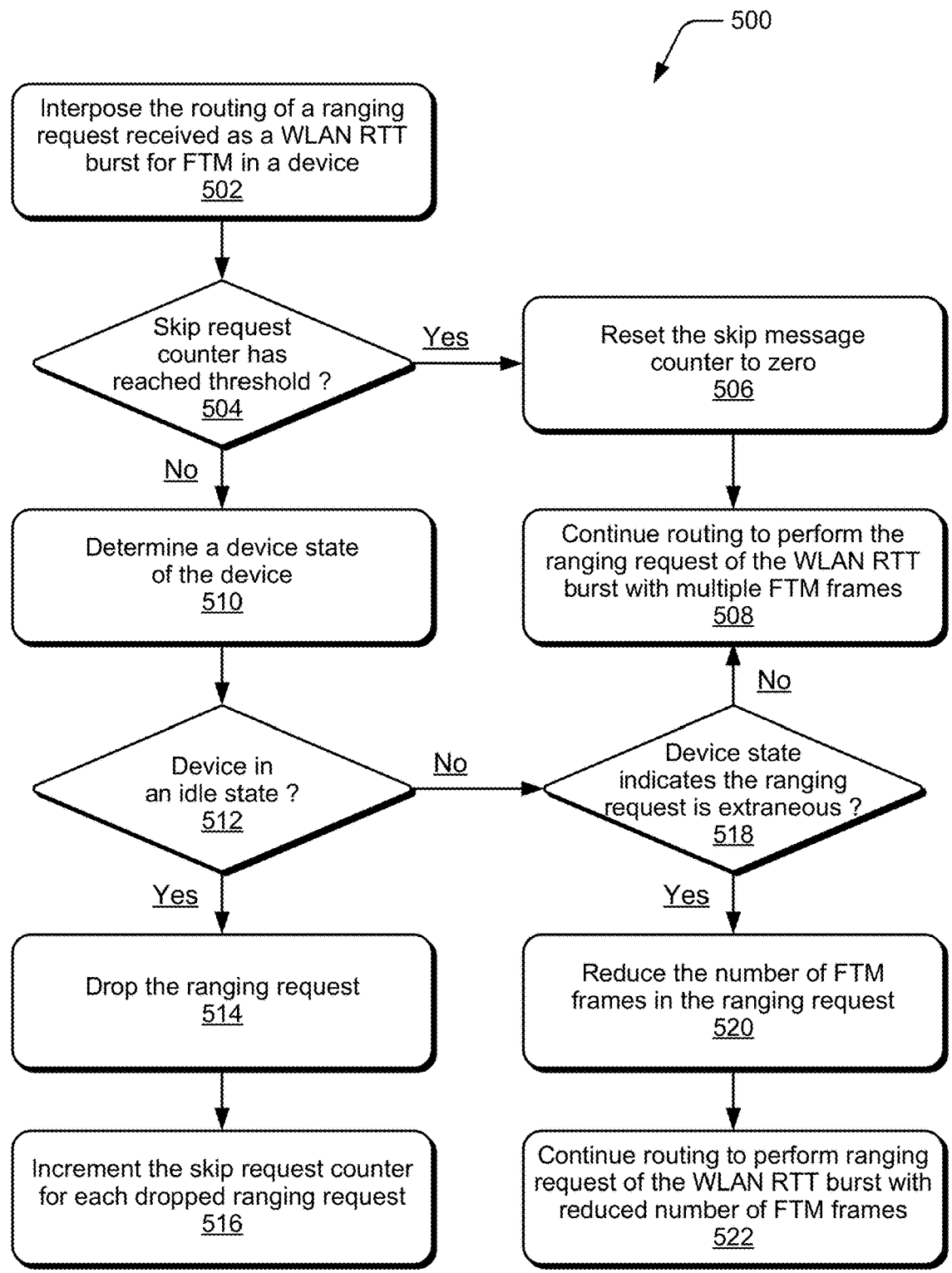
FIG. 5 illustrates an example method of managing FTM frames of WLAN RTT bursts in accordance with one or more implementations of the techniques described herein.

FIG. 5 illustrates example method(s) 500 of managing FTM frames of WLAN RTT bursts, and is generally described with reference to the status module implemented in a device. The order in which the method is described is not intended to be construed as a limitation, and any number or combination of the described method operations can be performed in any order to perform a method, or an alternate method.

At 502, the routing of a ranging request received as a WLAN RTT burst for FTM in a device is interposed with a message request monitor of a status module. For example, the message request monitor 130 of the status module 126 in the device 100 interposes the routing of the ranging request 136 that is received as a WLAN RTT burst 122 for FTM, such as initiated by a device application 120 and/or the FTM manager 144 in the device firmware 142. The message request monitor 130 also interposes the routing of ranging requests 136 that are communicated from a network device and received by the wireless radios 106 as WLAN RTT bursts and FTM frames 138. The message request monitor 130 interposes the ranging request 136, which generally refers to the functions or operations performed to detect and identify the ranging request 136, and subsequently determine whether the ranging request can be dropped or adjusted prior to being processed in the device 100 or transmitted from the device.

At 504, a determination is made as to whether a skip request counter has reached a threshold. For example, For example, the status module 126 in the device 100 includes the skip request counter 140 that increments each time a ranging request 136 is dropped, rather than the ranging request being processed in the device 100 or communicated from the device.

If the skip request counter has reached the threshold (i.e., "Yes" from 504), then at 506, the skip request counter is reset to zero, and at 508, the routing of the ranging request is continued in the device to perform the ranging request of the WLAN RTT burst with multiple FTM frames of the ranging request. For example, the status module 126 in the device 100 resets the skip request counter 140 to zero, continues to perform the ranging request 136 in the device 100, and routes the ranging request through the IP layer 114 to a corresponding component device for network communication or wireless transmission from the device 100 via the layers of the general layer architecture 110 to the corresponding network interface or wireless radio (e.g., the physical components in a physical layer of the general layer architecture 110).

If the skip request counter has not reached the threshold (i.e., "No" from 504), then at 510, a device state of the device is determined with a device state monitor of the status module. For example, the device state monitor 132 of the status module 126 in the device 100 determines the device state 148 of the device. In implementations, the device state 148 of the device 100 can be determined from the device sensors 146 that indicate the device is in a stationary mode or in a vehicle mode. Alternatively or in addition, the device state 148 of the device 100 can be determined based on a cellular data threshold change that indicates the device is stationary or rapidly moving, or based on a Wi-Fi data threshold change that indicates the device is stationary or rapidly moving, such as in a vehicle.

At 512, a determination is made as to whether the device is in an idle state. For example, the device state monitor 132 of the status module 126 is registered with the sensor HUB 128 in the data link layer 116, from which the device state monitor 132 receives sensor data from device sensors 146 and determines a device state 148. The device state monitor 132 can also determine an idle state of the CPU in the device 100. If the device is determined to be in an idle state (i.e., "Yes" from 512), then at 514, the ranging request is dropped and at 516, the skip request counter is incremented. For example, the status module 126 drops the ranging request 136, rather than the ranging request being processed in the device 100 or communicated from the device, which maintains the device 100 operating in a low-power or idle state and conserves battery power, as well as avoids contributing to communication bandwidth congestion. Further, the skip request counter 140 is incremented for each dropped ranging request.

If the device is not in an idle state (i.e., "No" from 512), then at 518, a determination is made as to whether the device state indicates the ranging request is extraneous. For example, the status module 126 determines whether the device state 148 indicates that wireless RTT ranging is extraneous (e.g., unneeded, irrelevant) if the device state 148 of the device 100 is in either the stationary mode or in the vehicle mode, due to the device generally not moving, or moving too fast to meaningfully perform the RTT ranging and determine the current location of the device. In implementations, the device state monitor 132 of the status module 126 determines the device state 148 based on input from one or more of the device sensors 146 that indicate the device 100 is in a stationary mode or in a vehicle mode.

If the ranging request is determined not to be extraneous (i.e., "No" from 518), then at 508, the routing of the ranging request is continued in the device to perform the ranging request of the WLAN RTT burst with multiple FTM frames of the ranging request. For example, the status module 126 in the device 100 continues to perform the ranging request 136 in the device 100, and routes the ranging request through the IP layer 114 to a corresponding component device for network communication or wireless transmission from the device 100 via the layers of the general layer architecture 110 to the corresponding network interface or wireless radio (e.g., the physical components in a physical layer of the general layer architecture 110).

If the ranging request is determined to be extraneous (i.e., "Yes" from 518), then at 520, the number of FTM frames in the ranging request are reduced based on the device state indicating that multiple FTM frames of the ranging request are extraneous. For example, the status module 126 reduces the number of FTM frames in the ranging request 136 based on a device state 148 indicating that multiple FTM frames of the ranging request are extraneous. The multiple FTM frames in the ranging request 136 can be extraneous in either of the stationary mode or the vehicle mode of the device 100, and reducing the number of FTM frames in the ranging request prevents physical transmission of the multiple FTM frames, conserving battery power of the device and avoiding contributing to communication bandwidth congestion.

At 522, the ranging request of the WLAN RTT burst is routed and performed with the reduced number of FTM frames in the ranging request. For example, the status module 126 routes the ranging request 136 of the WLAN RTT burst in the device 100 to perform the ranging request with the reduced number of FTM frames in the ranging request. The ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110).

Figure 6:
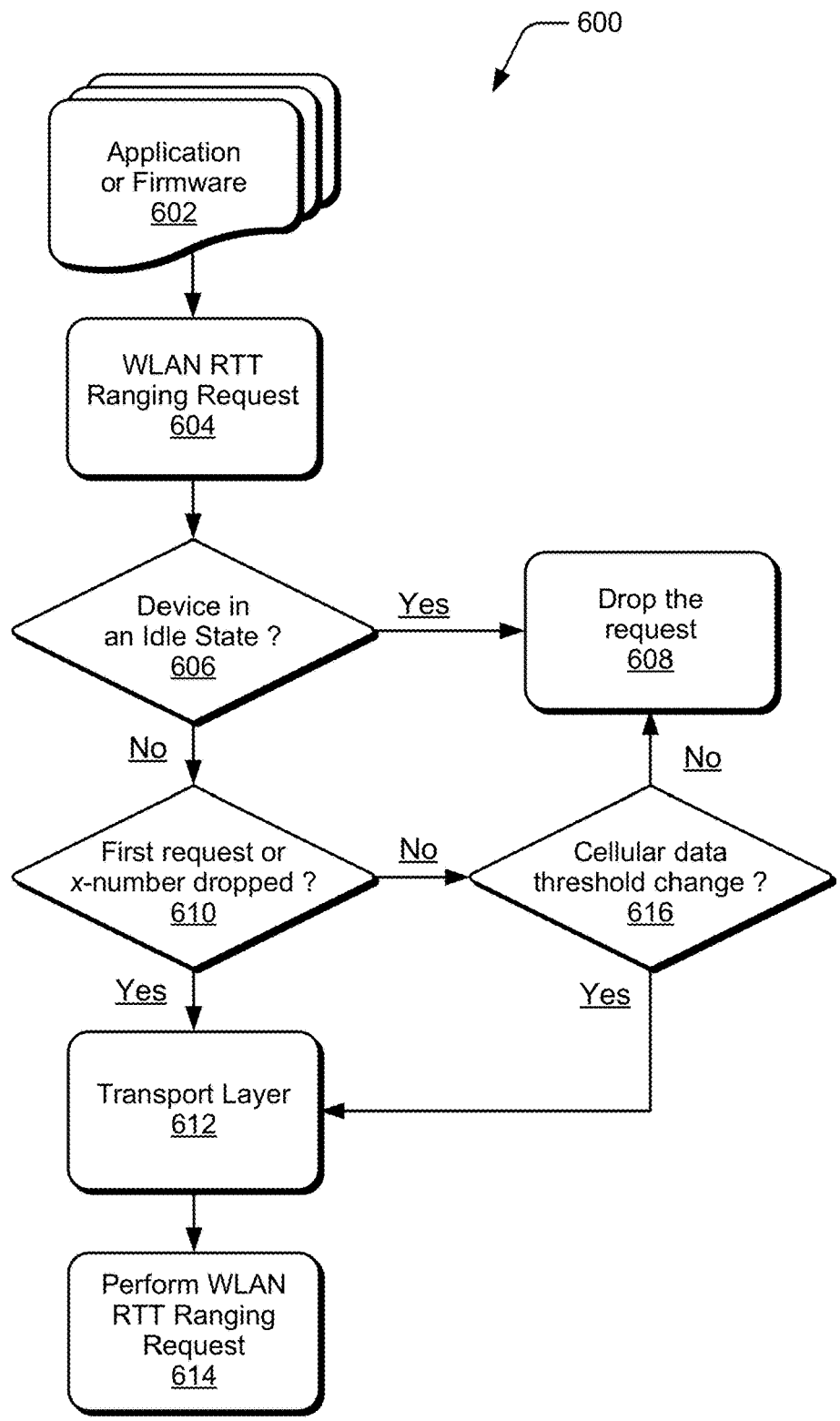
FIG. 6 illustrates an example method of managing FTM frames of WLAN RTT bursts in a device, such as based on device cellular data and dropping ranging requests in accordance with one or more implementations of the techniques described herein.

FIG. 6 illustrates example method(s) 600 of managing FTM frames of WLAN RTT bursts, and is generally described with reference to the status module implemented in a device and based on device cellular data. The order in which the method is described is not intended to be construed as a limitation, and any number or combination of the described method operations can be performed in any order to perform a method, or an alternate method.

At 602, a device initiates a WLAN RTT burst for FTM. For example, a device application 120 in the device 100 initiates a WLAN RTT burst 122 for FTM, such as to provide a location-based service for a user of the device, and the location of the device needs to be determined. Alternatively, the FTM manager 144 in the device firmware 142 offloads and manages ranging requests as the WLAN RTT bursts 122 for FTM in the device 100, and the FTM manager 144 initiates a WLAN RTT burst 122 for FTM. The device application 120 determines the relative or absolute location of the device, particularly in an indoor environment, within close accuracy based on distance measurements to three or more wireless access points using wireless RTT ranging requests fine timing measurements (FTM).

At 604, the WLAN RTT ranging request is received. For example, the message request monitor 130 of the status module 126 in the device 100 receives a ranging request 136 that is received as a WLAN RTT burst 122 for FTM, such as initiated by the device application 120 and/or the FTM manager 144 in the device firmware 142. The message request monitor 130 may also receive ranging requests 136 via the wireless radios 106 as WLAN RTT bursts and FTM frames 138 that are received by the device 100.

At 606, a determination is made as to whether the device is in an idle state. For example, the device state monitor 132 of the status module 126 is registered with the sensor HUB 128 in the data link layer 116, from which the device state monitor 132 receives sensor data from device sensors 146 and determines a device state 148. The device state monitor 132 can also determine an idle state of the CPU in the device 100. If the device is determined to be in an idle state (i.e., "Yes" from 606), then at 608, the ranging request is dropped. For example, the status module 126 drops the ranging request 136, rather than the ranging request being processed in the device 100 or communicated from the device, which maintains the device 100 operating in a low-power or idle state and conserves battery power, as well as avoids contributing to communication bandwidth congestion.

If the device is not in an idle state (i.e., "No" from 606), then at 610 a determination is made as to whether the WLAN RTT ranging request is the first initiated request, or whether a threshold x-number of ranging requests have already been dropped. For example, the status module 126 in the device 100 includes the skip request counter 140 that is incremented each time a ranging request is dropped, rather than being processed in the device and/or communicated from the device. Notably, if the ranging request 136 is not the first attempt at the particular message type, and the skip request counter 140 has not yet incremented to the threshold x-number of ranging requests that have already been dropped in the device, then a determination can be made as to whether the current ranging request 136 is extraneous and can be adjusted or dropped in the device.

If the WLAN RTT ranging request is determined to be the first initiated request, or the skip request counter has reached the threshold x-number of dropped ranging requests, then at 612, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 614, the WLAN RTT ranging request is performed by the device 100.

If the WLAN RTT ranging request is not the first initiated request, or the skip request counter has not yet incremented to the threshold x-number of dropped ranging requests (i.e., "No" from 610), then at 616, a determination is made as to whether a threshold change in cellular data at the device indicates the device does not need to update the current device location. For example, the device state monitor 132 of the status module 126 determines that cellular data indicates the device 100 is in either a stationary mode or in a vehicle mode. Notably, the ranging request 136 may be extraneous if the device state 148 of the device 100 is in either the stationary mode or in the vehicle mode, due to the device generally not moving, or moving too fast to meaningfully perform RTT ranging and determine the current location of the device. In implementations, the cellular data usable by the status module 126 to determine an update status can include any one or combination of a PCI/CellId (LTE physical cell identity), a delta of the received signal strength indicator (RSSI), the cellular network type, device registration data, a mobile country code (MCC), a mobile network code (MNC), and the like.

If the cellular data indicates no threshold change in the data and generally no need to update the current device location (i.e., "No" from 616), then at 608, the ranging request that was initiated by the device application or received via the wireless radios 106 as a WLAN RTT burst and FTM frames 138 is dropped. For example, the status module 126 in the device 100 drops the ranging request 136 based on the cellular data indicating that the device is generally stationary and does not need a location update. Notably, dropping the ranging request 136 can maintain the device operating in a low-power or idle state and conserves battery power, as well as avoids contributing to communication bandwidth congestion by processing or transmitting out the ranging request.

If the cellular data does indicate a threshold change in the data and generally to update the current device location (i.e., "Yes" from 616), then at 612, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 614, the WLAN RTT ranging request is performed by the device 100.

Figure 7:
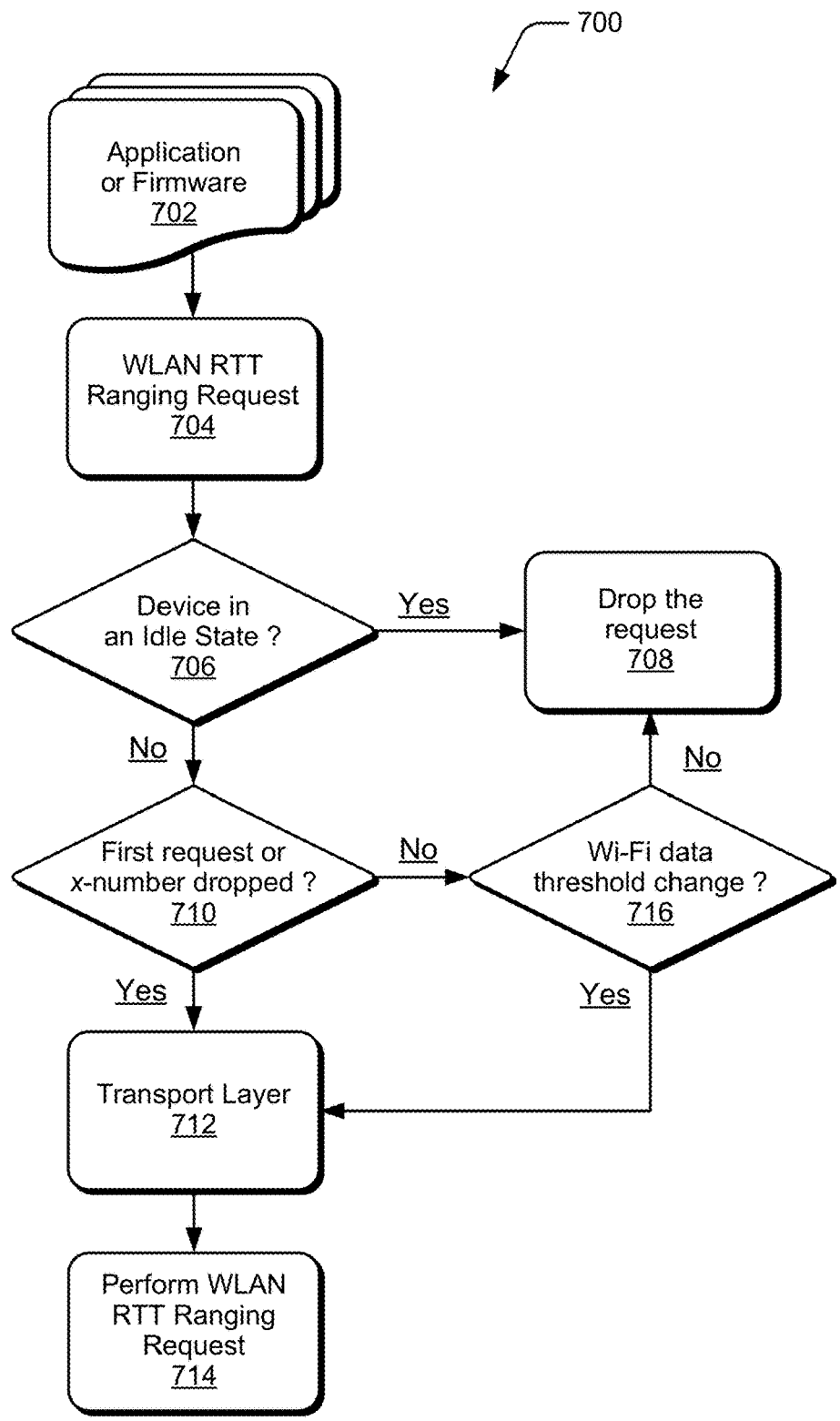
FIG. 7 illustrates an example method of managing FTM frames of WLAN RTT bursts in a device, such as based on device Wi-Fi data and dropping ranging requests in accordance with one or more implementations of the techniques described herein.

FIG. 7 illustrates example method(s) 700 of managing FTM frames of WLAN RTT bursts, and is generally described with reference to the status module implemented in a device and based on Wi-Fi data. The order in which the method is described is not intended to be construed as a limitation, and any number or combination of the described method operations can be performed in any order to perform a method, or an alternate method.

At 702, a device initiates a WLAN RTT burst for FTM. For example, a device application 120 in the device 100 initiates a WLAN RTT burst 122 for FTM, such as to provide a location-based service for a user of the device, and the location of the device needs to be determined. Alternatively, the FTM manager 144 in the device firmware 142 offloads and manages ranging requests as the WLAN RTT bursts 122 for FTM in the device 100, and the FTM manager 144 initiates a WLAN RTT burst 122 for FTM. The device application 120 determines the relative or absolute location of the device, particularly in an indoor environment, within close accuracy based on distance measurements to three or more wireless access points using wireless RTT ranging requests fine timing measurements (FTM).

At 704, the WLAN RTT ranging request is received. For example, the message request monitor 130 of the status module 126 in the device 100 receives a ranging request 136 that is received as a WLAN RTT burst 122 for FTM, such as initiated by the device application 120 and/or the FTM manager 144 in the device firmware 142. The message request monitor 130 may also receive ranging requests 136 via the wireless radios 106 as WLAN RTT bursts and FTM frames 138 that are received by the device 100.

At 706, a determination is made as to whether the device is in an idle state. For example, the device state monitor 132 of the status module 126 is registered with the sensor HUB 128 in the data link layer 116, from which the device state monitor 132 receives sensor data from device sensors 146 and determines a device state 148. The device state monitor 132 can also determine an idle state of the CPU in the device 100. If the device is determined to be in an idle state (i.e., "Yes" from 706), then at 708, the ranging request is dropped. For example, the status module 126 drops the ranging request 136, rather than the ranging request being processed in the device 100 or communicated from the device, which maintains the device 100 operating in a low-power or idle state and conserves battery power, as well as avoids contributing to communication bandwidth congestion.

If the device is not in an idle state (i.e., "No" from 706), then at 710 a determination is made as to whether the WLAN RTT ranging request is the first initiated request, or whether a threshold x-number of ranging requests have already been dropped. For example, the status module 126 in the device 100 includes the skip request counter 140 that is incremented each time a ranging request is dropped, rather than being processed in the device and/or communicated from the device. Notably, if the ranging request 136 is not the first attempt at the particular message type, and the skip request counter 140 has not yet incremented to the threshold x-number of ranging requests that have already been dropped in the device, then a determination can be made as to whether the current ranging request 136 is extraneous and can be adjusted or dropped in the device.

If the WLAN RTT ranging request is determined to be the first initiated request, or the skip request counter has reached the threshold x-number of dropped ranging requests, then at 712, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 714, the WLAN RTT ranging request is performed by the device 100.

If the WLAN RTT ranging request is not the first initiated request, or the skip request counter has not yet incremented to the threshold x-number of dropped ranging requests (i.e., "No" from 710), then at 716, a determination is made as to whether a threshold change in Wi-Fi data at the device indicates the device does not need to update the current device location. For example, the device state monitor 132 of the status module 126 determines that Wi-Fi data indicates the device 100 is in a stationary mode or in a vehicle mode. Notably, the ranging request 136 may be extraneous if the device state 148 of the device 100 is in either the stationary mode or in the vehicle mode, due to the device generally not moving, or moving too fast to meaningfully perform RTT ranging and determine the current location of the device. In implementations, the Wi-Fi data usable by the status module 126 to determine an update status can include any one or combination of a BSSID list of the MAC addresses of wireless access points from a previous scan, the received signal strength indicator (RSSI), Wi-Fi absolute location pillars, and the like.

If the Wi-Fi data indicates no threshold change in the data and generally no need to update the current device location (i.e., "No" from 716), then at 708, the ranging request that was initiated by the device application or received via the wireless radios 106 as a WLAN RTT burst and FTM frames 138 is dropped. For example, the status module 126 in the device 100 drops the ranging request 136 based on the Wi-Fi data indicating that the device is generally stationary and does not need a location update. Notably, dropping the ranging request 136 can maintain the device operating in a low-power or idle state and conserves battery power, as well as avoids contributing to communication bandwidth congestion by processing or transmitting out the ranging request.

If the Wi-Fi data does indicate a threshold change in the data and generally to update the current device location (i.e., "Yes" from 716), then at 712, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 714, the WLAN RTT ranging request is performed by the device 100.

Figure 8:
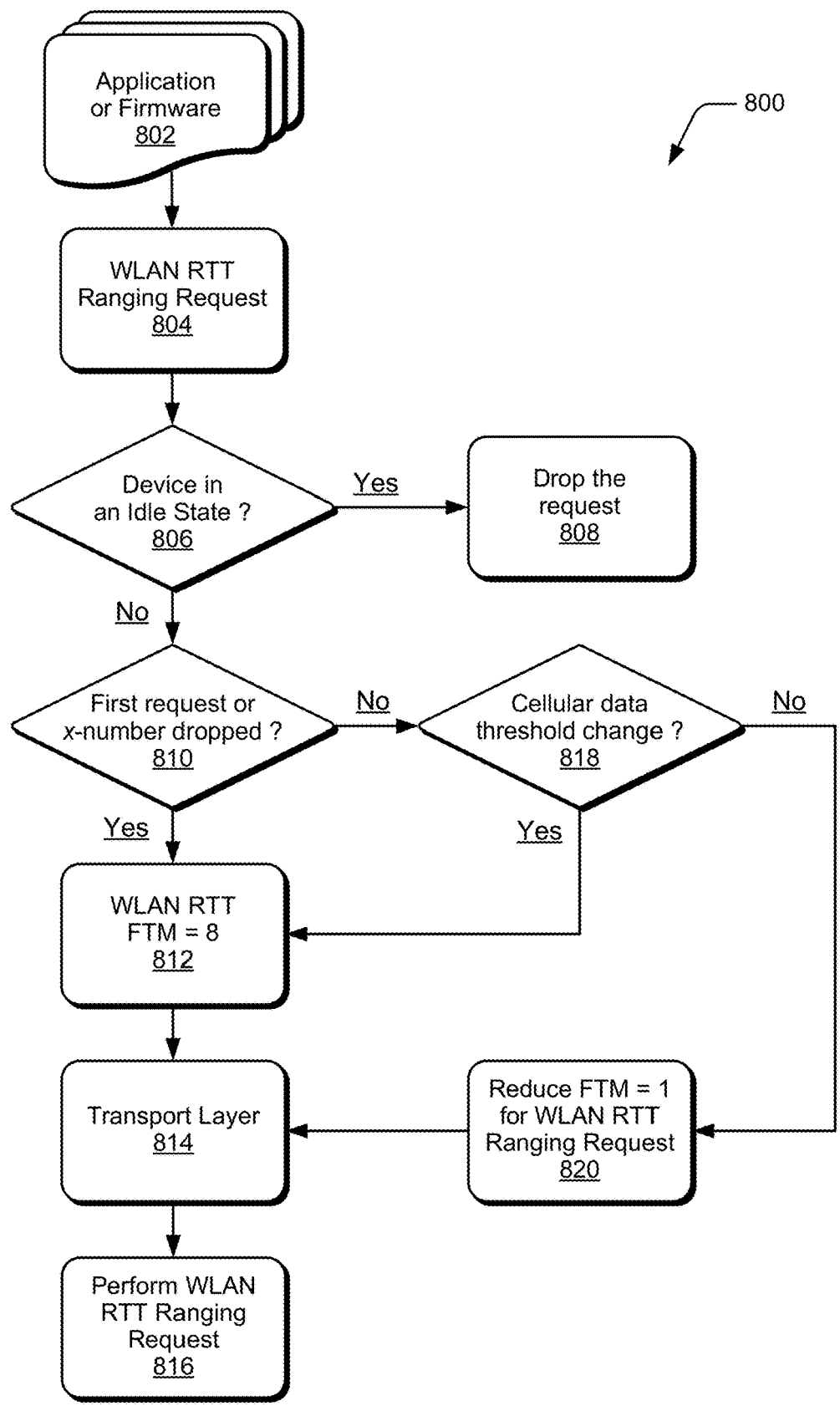
FIG. 8 illustrates an example method of managing FTM frames of WLAN RTT bursts in a device, such as based on device cellular data and reducing the number of FTM frames in accordance with one or more implementations of the techniques described herein.

FIG. 8 illustrates example method(s) 800 of managing FTM frames of WLAN RTT bursts and is generally described with reference to the status module implemented in a device and based on device sensors. The order in which the method is described is not intended to be construed as a limitation, and any number or combination of the described method operations can be performed in any order to perform a method, or an alternate method.

At 802, a device initiates a WLAN RTT burst for FTM. For example, a device application 120 in the device 100 initiates a WLAN RTT burst 122 for FTM, such as to provide a location-based service for a user of the device, and the location of the device needs to be determined. Alternatively, the FTM manager 144 in the device firmware 142 offloads and manages ranging requests as the WLAN RTT bursts 122 for FTM in the device 100, and the FTM manager 144 initiates a WLAN RTT burst 122 for FTM. The device application 120 determines the relative or absolute location of the device, particularly in an indoor environment, within close accuracy based on distance measurements to three or more wireless access points using wireless RTT ranging requests fine timing measurements (FTM).

At 804, the WLAN RTT ranging request is received. For example, the message request monitor 130 of the status module 126 in the device 100 receives a ranging request 136 that is received as a WLAN RTT burst 122 for FTM, such as initiated by the device application 120 and/or the FTM manager 144 in the device firmware 142. The message request monitor 130 may also receive ranging requests 136 via the wireless radios 106 as WLAN RTT bursts and FTM frames 138 that are received by the device 100.

At 806, a determination is made as to whether the device is in an idle state. For example, the device state monitor 132 of the status module 126 is registered with the sensor HUB 128 in the data link layer 116, from which the device state monitor 132 receives sensor data from device sensors 146 and determines a device state 148. The device state monitor 132 can also determine an idle state of the CPU in the device 100. If the device is determined to be in an idle state (i.e., "Yes" from 806), then at 808, the ranging request is dropped. For example, the status module 126 drops the ranging request 136, rather than the ranging request being processed in the device 100 or communicated from the device, which maintains the device 100 operating in a low-power or idle state and conserves battery power, as well as avoids contributing to communication bandwidth congestion.

If the device is not in an idle state (i.e., "No" from 806), then at 810 a determination is made as to whether the WLAN RTT ranging request is the first initiated request, or whether a threshold x-number of ranging requests have already been dropped. For example, the status module 126 in the device 100 includes the skip request counter 140 that is incremented each time a ranging request is dropped, rather than being processed in the device and/or communicated from the device. Notably, if the ranging request 136 is not the first attempt at the particular message type, and the skip request counter 140 has not yet incremented to the threshold x-number of ranging requests that have already been dropped in the device, then a determination can be made as to whether the current ranging request 136 is extraneous and can be adjusted or dropped in the device.

If the WLAN RTT ranging request is determined to be the first initiated request, or the skip request counter has reached the threshold x-number of dropped ranging requests, then at 812, the number of FTM data frames in the WLAN RTT burst for FTM is maintained as eight data frames for the ranging request. At 814, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 816, the WLAN RTT ranging request is performed by the device 100.

If the WLAN RTT ranging request is not the first initiated request, or the skip request counter has not yet incremented to the threshold x-number of dropped ranging requests (i.e., "No" from 810), then at 818, a determination is made as to whether a threshold change in cellular data at the device indicates the device does not need to update the current device location. For example, the device state monitor 132 of the status module 126 determines that cellular data indicates the device 100 is in either a stationary mode or in a vehicle mode. Notably, the ranging request 136 may be extraneous if the device state 148 of the device 100 is in either the stationary mode or in the vehicle mode, due to the device generally not moving, or moving too fast to meaningfully perform RTT ranging and determine the current location of the device. In implementations, the cellular data usable by the status module 126 to determine an update status can include any one or combination of a PCI/CellId (LTE physical cell identity), a delta of the received signal strength indicator (RSSI), the cellular network type, device registration data, a mobile country code (MCC), a mobile network code (MNC), and the like.

If the cellular data does indicate a threshold change in the data and generally to update the current device location (i.e., "Yes" from 818), then at 812, the number of FTM data frames in the WLAN RTT burst for FTM is maintained as eight data frames for the ranging request. At 814, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 816, the WLAN RTT ranging request is performed by the device 100.

If the cellular data indicates no threshold change in the data and generally no need to update the current device location (i.e., "No" from 818), then at 820, the number of FTM data frames in the WLAN RTT burst for FTM is reduced to one data frame for the ranging request. For example, the status module 126 reduces the number of FTM frames in the ranging request 136 based on the cellular data indicating that multiple FTM frames of the ranging request are extraneous. The status module 126 can then route the ranging request 136 of the WLAN RTT burst in the device 100 to perform the ranging request with the reduced number of FTM frames in the ranging request. For example, at 814, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 816, the WLAN RTT ranging request is performed by the device 100 with the reduced number of FTM frames in the ranging request.

Figure 9:
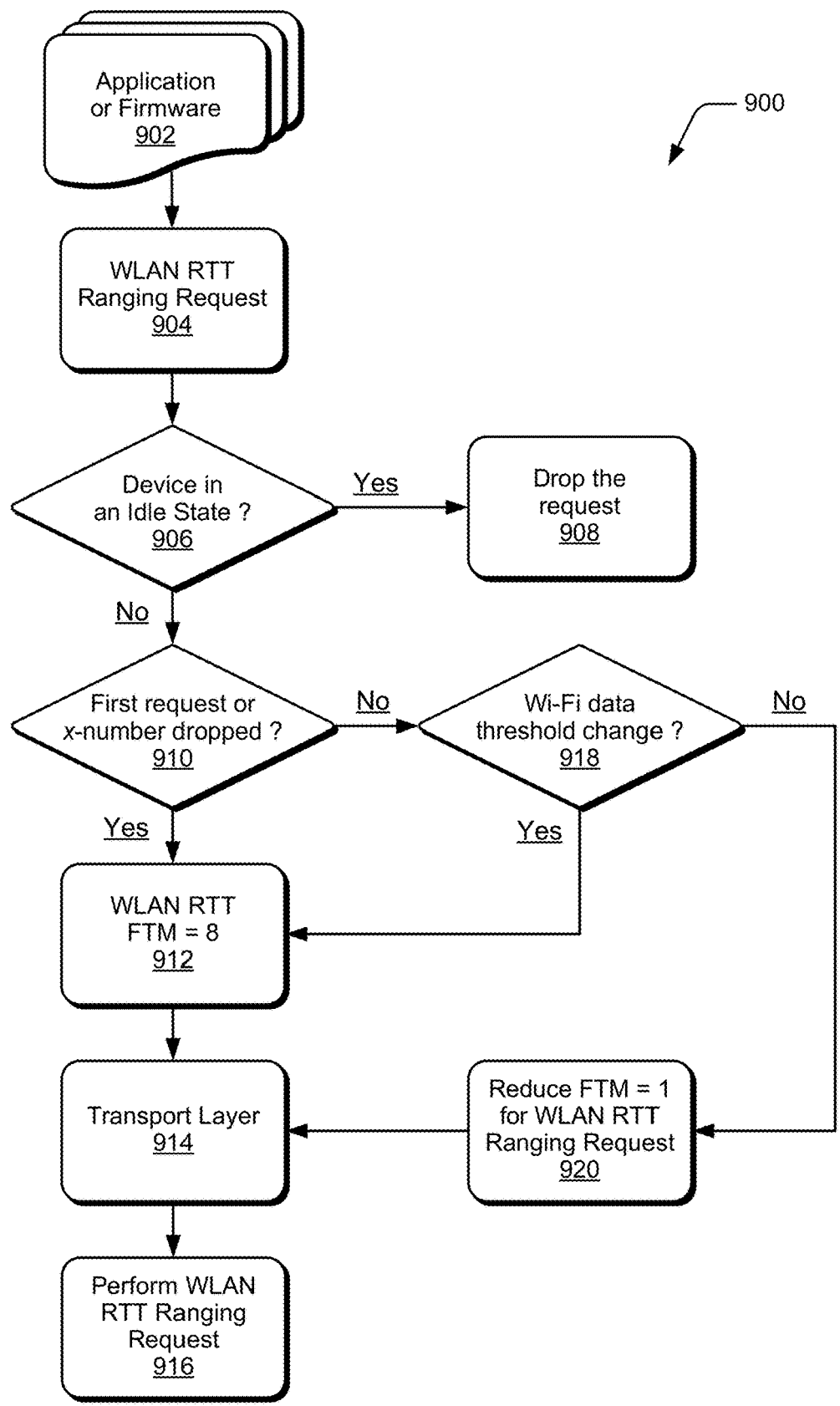
FIG. 9 illustrates an example method of managing FTM frames of WLAN RTT bursts in a device, such as based on device Wi-Fi data and reducing the number of FTM frames in accordance with one or more implementations of the techniques described herein.

FIG. 9 illustrates example method(s) 900 of managing FTM frames of WLAN RTT bursts and is generally described with reference to the status module implemented in a device and based on device sensors. The order in which the method is described is not intended to be construed as a limitation, and any number or combination of the described method operations can be performed in any order to perform a method, or an alternate method.

At 902, a device initiates a WLAN RTT burst for FTM. For example, a device application 120 in the device 100 initiates a WLAN RTT burst 122 for FTM, such as to provide a location-based service for a user of the device, and the location of the device needs to be determined. Alternatively, the FTM manager 144 in the device firmware 142 offloads and manages ranging requests as the WLAN RTT bursts 122 for FTM in the device 100, and the FTM manager 144 initiates a WLAN RTT burst 122 for FTM. The device application 120 determines the relative or absolute location of the device, particularly in an indoor environment, within close accuracy based on distance measurements to three or more wireless access points using wireless RTT ranging requests fine timing measurements (FTM).

At 904, the WLAN RTT ranging request is received. For example, the message request monitor 130 of the status module 126 in the device 100 receives a ranging request 136 that is received as a WLAN RTT burst 122 for FTM, such as initiated by the device application 120 and/or the FTM manager 144 in the device firmware 142. The message request monitor 130 may also receive ranging requests 136 via the wireless radios 106 as WLAN RTT bursts and FTM frames 138 that are received by the device 100.

At 906, a determination is made as to whether the device is in an idle state. For example, the device state monitor 132 of the status module 126 is registered with the sensor HUB 128 in the data link layer 116, from which the device state monitor 132 receives sensor data from device sensors 146 and determines a device state 148. The device state monitor 132 can also determine an idle state of the CPU in the device 100. If the device is determined to be in an idle state (i.e., "Yes" from 906), then at 908, the ranging request is dropped. For example, the status module 126 drops the ranging request 136, rather than the ranging request being processed in the device 100 or communicated from the device, which maintains the device 100 operating in a low-power or idle state and conserves battery power, as well as avoids contributing to communication bandwidth congestion.

If the device is not in an idle state (i.e., "No" from 906), then at 910 a determination is made as to whether the WLAN RTT ranging request is the first initiated request, or whether a threshold x-number of ranging requests have already been dropped. For example, the status module 126 in the device 100 includes the skip request counter 140 that is incremented each time a ranging request is dropped, rather than being processed in the device and/or communicated from the device. Notably, if the ranging request 136 is not the first attempt at the particular message type, and the skip request counter 140 has not yet incremented to the threshold x-number of ranging requests that have already been dropped in the device, then a determination can be made as to whether the current ranging request 136 is extraneous and can be adjusted or dropped in the device.

If the WLAN RTT ranging request is determined to be the first initiated request, or the skip request counter has reached the threshold x-number of dropped ranging requests, then at 912, the number of FTM data frames in the WLAN RTT burst for FTM is maintained as eight data frames for the ranging request. At 914, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 916, the WLAN RTT ranging request is performed by the device 100.

If the WLAN RTT ranging request is not the first initiated request, or the skip request counter has not yet incremented to the threshold x-number of dropped ranging requests (i.e., "No" from 910), then at 918, a determination is made as to whether a threshold change in Wi-Fi data at the device indicates the device does not need to update the current device location. For example, the device state monitor 132 of the status module 126 determines that Wi-Fi data indicates the device 100 is in either a stationary mode or in a vehicle mode. Notably, the ranging request 136 may be extraneous if the device state 148 of the device 100 is in either the stationary mode or in the vehicle mode, due to the device generally not moving, or moving too fast to meaningfully perform RTT ranging and determine the current location of the device. In implementations, the Wi-Fi data usable by the status module 126 to determine an update status can include any one or combination of a BSSID list of the MAC addresses of wireless access points from a previous scan, the received signal strength indicator (RSSI), Wi-Fi absolute location pillars, and the like.

If the Wi-Fi data does indicate a threshold change in the data and generally to update the current device location (i.e., "Yes" from 918), then at 912, the number of FTM data frames in the WLAN RTT burst for FTM is maintained as eight data frames for the ranging request. At 914, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 916, the WLAN RTT ranging request is performed by the device 100.

If the Wi-Fi data indicates no threshold change in the data and generally no need to update the current device location (i.e., "No" from 918), then at 920, the number of FTM data frames in the WLAN RTT burst for FTM is reduced to one data frame for the ranging request. For example, the status module 126 reduces the number of FTM frames in the ranging request 136 based on the Wi-Fi data indicating that multiple FTM frames of the ranging request are extraneous. The status module 126 can then route the ranging request 136 of the WLAN RTT burst in the device 100 to perform the ranging request with the reduced number of FTM frames in the ranging request. For example, at 914, the ranging request 136 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110). Further, at 916, the WLAN RTT ranging request is performed by the device 100 with the reduced number of FTM frames in the ranging request.

Figure 10:
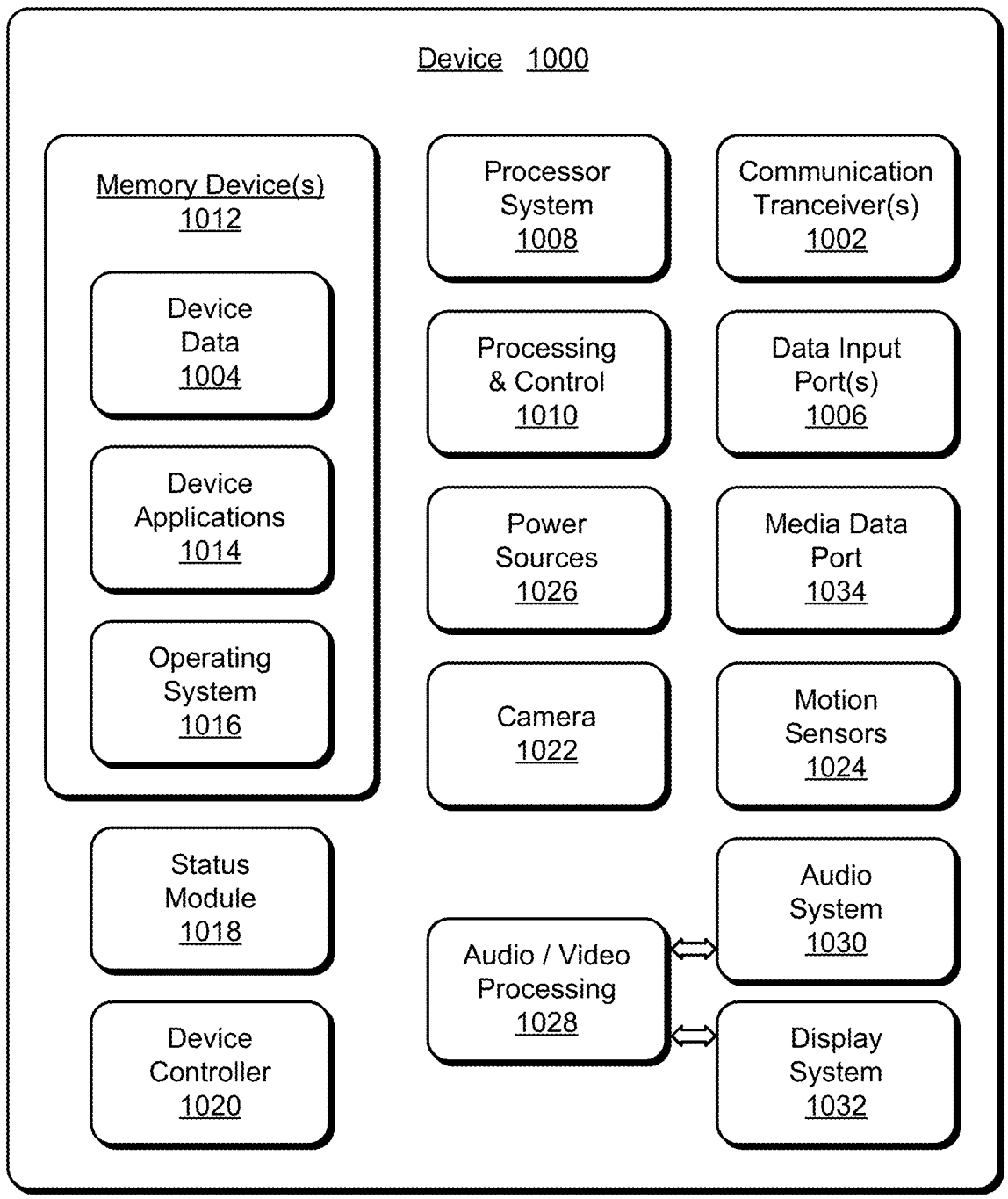
FIG. 10 illustrates various components of an example device that can implement aspects of managing FTM frames of WLAN RTT bursts.

FIG. 10 illustrates various components of an example device 1000, in which aspects of managing FTM frames of WLAN RTT bursts can be implemented. The example device 1000 can be implemented as any of the devices described with reference to the previous FIGS. 1-9, such as any type of a device, mobile device, access point, node device, IoT device, mobile phone, client device, wearable device, tablet, computing, communication, entertainment, gaming, media playback, and/or other type of electronic device. For example, the device 100 shown and described with reference to FIG. 1 may be implemented as the example device 1000. Further a wearable device may include any one or combination of a watch, armband, wristband, bracelet, glove or pair of gloves, glasses, jewelry items, clothing items, any type of footwear or headwear, and/or other types of wearables.

The device 1000 includes communication transceivers 1002 that enable wired and/or wireless communication of device data 1004 with other devices. The device data 1004 can include any of the status module generated and/or determined data, as well as WLAN RTT bursts and FTM data frames. Additionally, the device data 1004 can include any type of audio, video, and/or image data. Example communication transceivers 1002 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processor system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, modules, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processor system 1008. The device applications may also include a device manager, such as any form of a control application, software application, signal-processing and control module, code that is native to a particular device, a hardware abstraction layer for a particular device, and so on.

In this example, the device 1000 includes a status module 1018 that implements aspects of managing FTM frames of WLAN RTT bursts, as well as a device controller 1020. The status module 1018 may be implemented with hardware components and/or in software as one of the device applications 1014, such as when the device 1000 is implemented as the device 100 described with reference to FIG. 1. An example of the status module 1018 is the status module 126 that is implemented as a software application and/or as hardware components in the device 100. In implementations, the status module 1018 may include independent processing, memory, and logic components as a computing and/or electronic device integrated with the device 1000.

In this example, the device 1000 also includes a camera 1022 and motion sensors 1024, such as may be implemented as components of an inertial measurement unit (IMU). The motion sensors 1024 can be implemented with various sensors, such as a gyroscope, an accelerometer, and/or other types of motion sensors to sense motion of the device. The motion sensors 1024 can generate sensor data vectors having three-dimensional parameters (e.g., rotational vectors in x, y, and z coordinates) indicating position, location, and/or orientation of the device. The device 1000 can also include one or more power sources 1026, such as when the device is implemented as a mobile device. The power sources may include a charging and/or power system, and can be implemented as a flexible strip battery, a rechargeable battery, a charged super-capacitor, and/or any other type of active or passive power source.

The device 1000 can also include an audio and/or video processing system 1028 that generates audio data for an audio system 1030 and/or generates display data for a display system 1032. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1034. In implementations, the audio system and/or the display system are integrated components of the example device. Alternatively, the audio system and/or the display system are external, peripheral components to the example device.

Although implementations of managing FTM frames of WLAN RTT bursts have been described in language specific to features and/or methods, the subject of the appended claims is not necessarily limited to the specific features or methods described. Rather, the specific features and methods are disclosed as example implementations of managing FTM frames of WLAN RTT bursts, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: interposing a routing of a ranging request received as a wireless local area network (WLAN) round trip time (RTT) burst for fine timing measurement (FTM) in a device with a message request monitor of a status module; determining a device state of the device with a device state monitor of the status module; reducing a number of FTM frames in the ranging request based on the device state indicating that multiple FTM frames of the ranging request are extraneous; and routing to perform the ranging request of the WLAN RTT burst with the reduced number of FTM frames in the ranging request.

Alternatively or in addition to the above described method, any one or combination of: dropping the ranging request if the device state is an idle device state; and incrementing a skip request counter for each dropped ranging request. The method further overriding the determining the device state of the device based on a skip request counter that increments for each dropped ranging request reaching a threshold; routing to perform the ranging request of the WLAN RTT burst with the multiple FTM frames in the ranging request; and resetting the skip request counter to zero. The WLAN RTT burst for FTM is one of initiated by a device application in the device, initiated by a FTM manager in device firmware, or received as the ranging request communicated from a network device. The device state is determined from one or more device sensors that indicate the device being in one of a stationary mode or in a vehicle mode, and wherein the multiple FTM frames in the ranging request are extraneous in either of the stationary mode or the vehicle mode of the device. The device state is determined based on one of a cellular data threshold change that indicates the device is stationary or rapidly moving, or a Wi-Fi data threshold change that indicates the device is stationary or rapidly moving. The reducing the number of FTM frames in the ranging request prevents physical transmission of the multiple FTM frames and conserves battery power of the device. The reducing the number of FTM frames in the ranging request avoids contributing to communication bandwidth congestion.

A device, comprising: a device application or fine timing measurement (FTM) manager in device firmware to initiate a ranging request as a wireless local area network (WLAN) round trip time (RTT) burst for FTM; a status module implemented at least partially in hardware to: interpose a routing of the ranging request in the device with a message request monitor of the status module; determine a device state of the device with a device state monitor of the status module; reduce a number of FTM frames in the ranging request based on the device state indicating that multiple FTM frames of the ranging request are extraneous; and route to perform the ranging request of the WLAN RTT burst with the reduced number of FTM frames in the ranging request.

Alternatively or in addition to the above described device, any one or combination of: the status module is implemented to drop the ranging request if the device state is an idle device state; and increment a skip request counter for each dropped ranging request. The status module is implemented to override to determine the device state of the device based on skip request counter that increments for each dropped ranging request reaching a threshold; route to perform the ranging request of the WLAN RTT burst with the multiple FTM frames in the ranging request; and reset the skip request counter to zero. The WLAN RTT burst for FTM is one of initiated by the device application in the device, initiated by the FTM manager in device firmware, or received as the ranging request communicated from a network device. The device state monitor of the status module is implemented to determine the device state based on input from one or more device sensors that indicate the device being in one of a stationary mode or in a vehicle mode, and wherein the multiple FTM frames in the ranging request are extraneous in either of the stationary mode or the vehicle mode of the device. The device state monitor of the status module is implemented to determine the device state based on one of a cellular data threshold change that indicates the device is stationary or rapidly moving, or a Wi-Fi data threshold change that indicates the device is stationary or rapidly moving. The status module is implemented to reduce the number of FTM frames in the ranging request effective to conserve battery power of the device and avoid contributing to communication bandwidth congestion.

A method, comprising: receiving a ranging request as a wireless local area network (WLAN) round trip time (RTT) burst for fine timing measurement (FTM) in a device; determining whether the ranging request is necessary based on a device state of the device; and one of: dropping the ranging request if the device state is an idle device state such that the ranging request is extraneous; routing to perform the ranging request of the WLAN RTT burst with a reduced number of FTM frames in the ranging request based on the device state indicating that multiple FTM frames of the ranging request are extraneous; or routing to perform the ranging request of the WLAN RTT burst with the multiple FTM frames in the ranging request.

Alternatively or in addition to the above described method, any one or combination of: overriding a determination of the device state of the device based on a skip request counter that increments for each dropped ranging request reaching a threshold; routing to perform the ranging request of the WLAN RTT burst with the multiple FTM frames in the ranging request; and resetting the skip request counter to zero. The method further determining the device state of the device from one or more device sensors that indicate the device being in one of a stationary mode or in a vehicle mode, wherein the multiple FTM frames in the ranging request are extraneous in either of the stationary mode or the vehicle mode of the device. The method further determining the device state based on one of a cellular data threshold change that indicates the device is stationary or rapidly moving, or a Wi-Fi data threshold change that indicates the device is stationary or rapidly moving. The method further reducing the number of FTM frames in the ranging request preventing physical transmission of the multiple FTM frames and conserving battery power of the device.

The invention claimed is:

1. A method, comprising:
   interposing a routing of a ranging request received as a wireless local area network (WLAN) round trip time (RTT) burst for fine timing measurement (FTM) in a device with a message request monitor of a status module;
   overriding a device state of the device based on a skip request counter that increments for each dropped ranging request reaching a threshold;
   routing to perform the ranging request of the WLAN RTT burst with multiple FTM frames in the ranging request rather than with a reduced number of the FTM frames in the ranging request; and
   resetting the skip request counter to zero.

2. The method as recited in claim 1, further comprising:
   dropping the ranging request if the device state is an idle device state; and incrementing the skip request counter for each dropped ranging request.

3. The method as recited in claim 1, further comprising:
   reducing a number of the FTM frames in the ranging request based on the device state indicating that the multiple FTM frames of the ranging request are extraneous; and
   routing to perform the ranging request of the WLAN RTT burst with the reduced number of the FTM frames in the ranging request.

4. The method as recited in claim 1, wherein the WLAN RTT burst for FTM is one of initiated by a device application in the device, initiated by a FTM manager in device firmware, or received as the ranging request communicated from a network device.

5. The method as recited in claim 1, wherein the device state is determined from one or more device sensors that indicate the device being in one of a stationary mode or in a vehicle mode, and wherein the multiple FTM frames in the ranging request are extraneous in either of the stationary mode or the vehicle mode of the device.

6. The method as recited in claim 1, wherein the device state is determined based on one of a cellular data threshold change that indicates the device is stationary or rapidly moving, or a Wi-Fi data threshold change that indicates the device is stationary or rapidly moving.

7. The method as recited in claim 1, wherein the reducing the number of FTM frames in the ranging request prevents physical transmission of the multiple FTM frames and conserves battery power of the device.

8. The method as recited in claim 1, wherein the reducing the number of FTM frames in the ranging request avoids contributing to communication bandwidth congestion.

9. A device, comprising:
   a device application or fine timing measurement (FTM) manager in device firmware to initiate a ranging request as a wireless local area network (WLAN) round trip time (RTT) burst for FTM;
   a status module implemented at least partially in hardware to:
   interpose a routing of the ranging request in the device with a message request monitor of the status module;
   override a device state of the device based on a skip request counter that increments for each dropped ranging request reaching a threshold;
   route to perform the ranging request of the WLAN RTT burst with multiple FTM frames in the ranging request rather than with a reduced number of the FTM frames in the ranging request; and
   reset the skip request counter to zero.

10. The device as recited in claim 9, wherein the status module implemented to:
    drop the ranging request if the device state is an idle device state; and
    increment the skip request counter for each dropped ranging request.

11. The device as recited in claim 9, wherein the status module implemented to:
    reduce a number of the FTM frames in the ranging request based on the device state indicating that the multiple FTM frames of the ranging request are extraneous; and
    route to perform the ranging request of the WLAN RTT burst with the reduced number of the FTM frames in the ranging request.

12. The device as recited in claim 9, wherein the WLAN RTT burst for FTM is one of initiated by the device application in the device, initiated by the FTM manager in device firmware, or received as the ranging request communicated from a network device.

13. The device as recited in claim 9, wherein the device state monitor of the status module is implemented to determine the device state based on input from one or more device sensors that indicate the device being in one of a stationary mode or in a vehicle mode, and wherein the multiple FTM frames in the ranging request are extraneous in either of the stationary mode or the vehicle mode of the device.

14. The device as recited in claim 9, wherein the device state monitor of the status module is implemented to determine the device state based on one of a cellular data threshold change that indicates the device is stationary or rapidly moving, or a Wi-Fi data threshold change that indicates the device is stationary or rapidly moving.

15. The device as recited in claim 9, wherein the status module is implemented to reduce the number of FTM frames in the ranging request effective to conserve battery power of the device and avoid contributing to communication bandwidth congestion.

16. A method, comprising:
    receiving a ranging request as a wireless local area network (WLAN) round trip time (RTT) burst for fine timing measurement (FTM) in a device;
    determining whether the ranging request is necessary based on a device state of the device;

overriding the device state of the device based on a skip request counter that increments for each dropped ranging request reaching a threshold;

routing to perform the ranging request of the WLAN RTT burst with multiple FTM frames in the ranging request rather than with a reduced number of the FTM frames in the ranging request; and resetting the skip request counter to zero.

17. The method as recited in claim 16, further comprising:

dropping the ranging request if the device state is an idle device state such that the ranging request is extraneous;

routing to perform the ranging request of the WLAN RTT burst with the reduced number of FTM frames in the ranging request based on the device state indicating that the multiple FTM frames of the ranging request are extraneous; and incrementing the skip request counter for the dropped ranging request.

18. The method as recited in claim 16, further comprising:

determining the device state of the device from one or more device sensors that indicate the device being in one of a stationary mode or in a vehicle mode, wherein the multiple FTM frames in the ranging request are extraneous in either of the stationary mode or the vehicle mode of the device.

19. The method as recited in claim 16, further comprising:

determining the device state based on one of a cellular data threshold change that indicates the device is stationary or rapidly moving, or a Wi-Fi data threshold change that indicates the device is stationary or rapidly moving.

20. The method as recited in claim 16, further comprising:

reducing the number of FTM frames in the ranging request preventing physical transmission of the multiple FTM frames and conserving battery power of the device.

\* \* \* \* \*